US012197703B1

(12) United States Patent
McNamara et al.

(10) Patent No.: US 12,197,703 B1
(45) Date of Patent: Jan. 14, 2025

(54) SYSTEM FOR MANAGING PROFILE DATA FOR USERS IN A FACILITY

(71) Applicant: AMAZON TECHNOLOGIES, INC., Seattle, WA (US)

(72) Inventors: Alexander Michael McNamara, Seattle, WA (US); Sridhar Boyapati, Sammamish, WA (US); Korwin Jon Smith, Seattle, WA (US); Aaron Craig Thompson, Seattle, WA (US); Ammar Chinoy, Seattle, WA (US); David Echevarria Ignacio, Seattle, WA (US)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 117 days.

(21) Appl. No.: 17/816,137

(22) Filed: Jul. 29, 2022

Related U.S. Application Data

(63) Continuation of application No. 14/496,844, filed on Sep. 25, 2014, now Pat. No. 11,402,971.

(51) Int. Cl.
*G06F 3/0484* (2022.01)
*G06Q 10/087* (2023.01)
*G06V 40/16* (2022.01)
*G06V 40/70* (2022.01)

(52) U.S. Cl.
CPC ......... *G06F 3/0484* (2013.01); *G06Q 10/087* (2013.01); *G06V 40/171* (2022.01); *G06V 40/173* (2022.01); *G06V 40/70* (2022.01)

(58) Field of Classification Search
CPC .. G06F 3/0484; G06Q 10/087; G06V 40/171; G06V 40/173; G06V 40/70
See application file for complete search history.

(56) References Cited

U.S. PATENT DOCUMENTS

| 9,426,525 | B2* | 8/2016 | Soundararajan | H04N 21/44226 |
|---|---|---|---|---|
| 2013/0198299 | A1* | 8/2013 | Chhaochharia | H04L 51/04 709/206 |
| 2013/0346550 | A1* | 12/2013 | Higgins | G06Q 30/0201 709/217 |
| 2014/0309868 | A1* | 10/2014 | Ricci | G06Q 10/00 701/36 |
| 2014/0372430 | A1* | 12/2014 | Sitruk | G06F 16/337 707/736 |

* cited by examiner

*Primary Examiner* — A. Hunter Wilder
(74) *Attorney, Agent, or Firm* — Lindauer Law, PLLC

(57) ABSTRACT

Users in a facility may move about and their authentication status may change accordingly. For example, upon entering a facility, a user may present identification data. At that point, the user is considered an authenticated user with persistent profile data. However, the identification of a user may not be presented at entry or may be unreliable, which causes the user to be considered an unauthenticated user with temporary profile data. In other scenarios, the identification of authenticated users may become unreliable based on their location or their proximity to other users. In cases where users are crowded at a location, the profile data for such users may be aggregated and may be based on common settings of the set of possible users in the group. A user interface may be presented to a user based on their designated profile data.

20 Claims, 12 Drawing Sheets

SYSTEM FOR MANAGING PROFILE DATA FOR USERS IN A FACILITY

PRIORITY

This application is a continuation of, and claims priority to, U.S. patent application Ser. No. 14/496,844, filed on Sep. 25, 2014, entitled "User Interface Preference Management", which is hereby incorporated by reference in its entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, it is picked from its current location and transitioned to a new location. It is often desirable to provide to users information associated with the items in inventory, other users, or other information about operation of the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
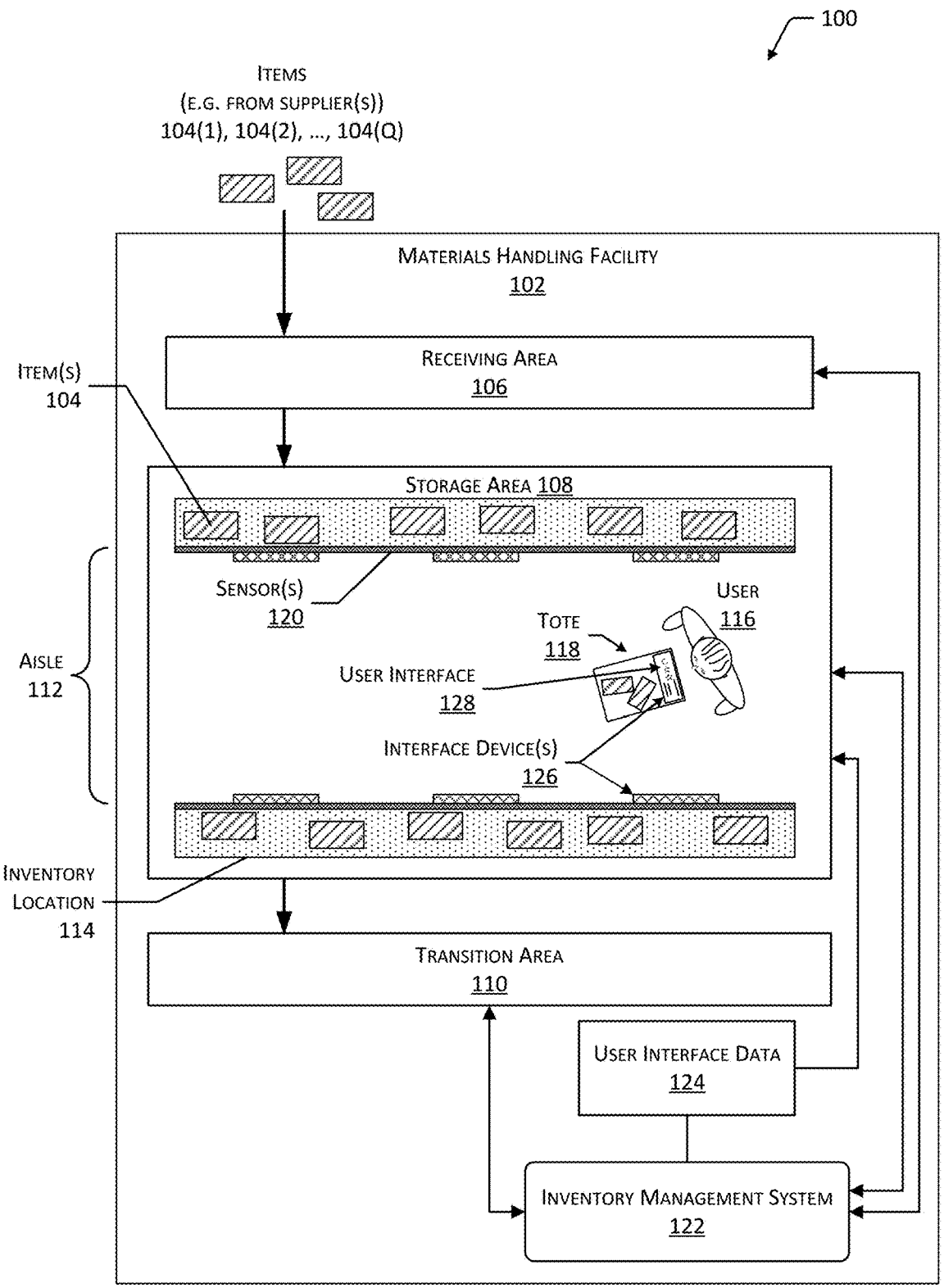
FIG. 1 is a block diagram illustrating a materials handling facility configured to present information to users in a user interface, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for managing a user interface provided to a user of a materials handling facility (facility). The facility may include, or have access to, an inventory management system. The inventory management system may be configured to maintain information about items, users, condition of the facility, and so forth. For example, the inventory management system may maintain data indicative of what items a particular user is ordered to pick, location of the particular user, availability of a user providing support services to others, requests for assistance, environmental status of the facility, and so forth.

Operation of the inventory management system may be supported by sensor data acquired by one or more sensors. The sensor data may include image data acquired by imaging devices such as cameras, information acquired from radio frequency tags, weight sensors, and so forth.

A user may access the facility to perform one or more actions. For example, the user may enter the facility to purchase items. The inventory management system may attempt to identify the user by comparing sensor data with previously stored persistent identity data. For example, a facial recognition system may be used to identify the user depicted in the image data. The identity of the user may be authenticated to determine or establish veracity of the identification. For example, the identity of the user may be authenticated by receipt of a username and password that is compared to the persistent identity data. In other examples, the user may be authenticated by presenting a token carrying authentication credentials, responding to a series of challenges for information, providing biometric data, and so forth.

Some users of the facility may be associated with a temporary identity and may be unauthenticated during at least part of their use of the facility. For example, a new user may enter the facility, a previously known user having persistent identity data may enter the facility but not be authenticated, or confidence may be lost in the authentication of a user having persistent identity data. The unauthenticated user may be provided with a temporary identity to distinguish the unauthenticated user, or data associated therewith, from other users including those who are authenticated and are thus associated with a persistent identity.

Occurrences in the facility involving the user may be associated with the user identity, either persistent or temporary. For example, the occurrence may comprise removing an item from the facility. Responsive to this occurrence, the inventory management system may bill a financial account associated with the user identity (either persistent or temporary) for the cost of the item.

During operation, the inventory management system may present the user interface using one or more interface devices. The user interface may be configured to present information that may be of use to the user. The interface device may include one or more display devices, audio output devices, haptic output devices, and so forth. The user interface may include one or more of visible, audible, or haptic elements. For example, the visible elements may include graphical representations such as icons, images, video, graphs, text, and so forth while the audible elements may include particular sounds. The interface device may also include or be used in conjunction with an input device. For example, a display device may include a touch sensor to provide a touchscreen capable of presenting visible output and accepting touch input.

The user interface may be configured or generated using information specified in a profile that may be associated with a particular user identity, such as a persistent identity or a temporary identity. The profile may indicate particular preferences as to the type of information presented, format of the presentation, preferred user interface theme, limits on presentation of public or confidential data, and so forth associated with the user. In some implementations, the profile may include information indicative of special accommodations for the user. For example, the accommodations may indicate that the user requires assistance lifting heavy objects, reaching high shelves, is in a wheelchair, is visually impaired, is deaf, and so forth.

A profile may be designated as a transient, persistent, or aggregate profile. The transient profile may exist for a limited duration in time, such as while the user is in the facility. For example, the transient profile may be discarded or erased after the user leaves the facility. The persistent profile is stored and available for future use. For example, the persistent profile may be maintained after the user leaves the facility, for access in the future should that user return. The aggregate profile may comprise a composite of elements from one or more other profiles, transient, persistent, or both. For example, the aggregate profile may comprise common settings of a language preference of a majority of users in a group.

An authenticated user of the facility who is associated with persistent user data and a persistent profile may experience interface devices presenting a user interface that is consistent with previous experiences and preferences as stored in the persistent profile. For example, the user interfaces may present a familiar language, use a preferred mode of presentation such as visual or audible, and so forth to the authenticated user.

An unauthenticated user, or an authenticated user for which no persistent profile has been created, may be presented with a user interface generated using a transient profile. The transient profile may start with a set of default values, but during use of the facility, the transient profile may be modified to indicate preferences of the user.

In some implementations, the inventory management system may use information about occurrences involving the user, the presented user interface, other users, or other objects in the facility to add detail to the profile. For example, the transient profile may default to "English" as the language, but upon hearing the unauthenticated user speak in French may be modified to a default language of "French". As the unauthenticated user continues to use the facility, the transient profile may become more detailed to include information about preferences such as preferred user interface ("UI") mode (e.g., visual, audible, haptic), preferred UI appearance (e.g. one visual theme over another), and so forth. Similarly, use by the authenticated user having an associated persistent profile may result in modification to the persistent profile.

In some implementations a transient profile may be converted to, or merged with, a persistent profile. For example, the user may enter the facility and be unidentified. As a result, a temporary identity and associated transient profile may be generated for that unidentified user. The user now associated with the temporary identity may be unauthenticated. Unauthenticated users may include those users who have been assigned a temporary identity, or may include those users who may have previously been associated with a persistent identity but for whom the level of assurance as to their identity is below a threshold confidence.

The temporary identity of the user may later be converted or replaced with a persistent identity associated with the user. For example, the unauthenticated user that is associated with a temporary identity may provide authentication information such as biometric data, a username and password, and so forth. Following successful authentication, the temporary identity may be converted to a persistent identity. Following successful authentication, the transient profile corresponding to the temporary identity that is now the persistent identity may be converted to a persistent profile for later use. In some implementations, the user may indicate that the inventory management system may store the authentication, persistent identity, and persistent profile for later use.

The identity of the user may become ambiguous in some situations, resulting in a loss of authentication. For example, a number of users may approach a common location, crowd together, and then depart in different directions. Some of the users may have temporary identities while others have persistent identities. In this situation, the inventory management system may require additional sensor data, processing time, or both, to re-associate a particular user with their user identity, temporary or persistent.

When the identity of the user is ambiguous, such as when the user is unauthenticated, an aggregate profile may be used to provide the user interface to that user. The aggregate profile may be based, at least in part, on the transient or persistent profile(s) for the user identities that may have been present when the identity became ambiguous.

In one implementation, the aggregate profile may be based, at least in part, on possible user identities, either transient or persistent, that may correspond to the user. For example, the aggregate profile may be based on persistent profiles associated with one or more probable user identities of the unauthenticated user. Continuing the example, the user may be tentatively identified as being "Albert" but is unauthenticated. The aggregate profile may be based on the profile associated with the user identity "Albert".

In another implementation, the aggregate profile may be based, at least in part, on profiles associated with a set of possible user identities that may be generated. For example, the set may include the user identities of all those users who were close to one another in the crowd. The profiles (transient, persistent, or other aggregate) associated with the user identities in the set may be accessed and used to generate the aggregate profile. For example, if the majority of profiles indicate a language preference of "English" the aggregate profile may be configured to present in English.

In the situation where the user identity is ambiguous the user identity may be considered unauthenticated and the inventory management system may be configured to prevent the presentation of information that may be deemed confidential. For example, special pricing information for items in the facility that is applicable to one user may be omitted from the user interface when that user's identity is unauthenticated. Once the user identity has been authenticated, the user interface based on the associated profile may be presented. For example, the persistent profile associated with the persistent identity may be presented.

In another situation, where the users (either authenticated or unauthenticated) are known, but a plurality of users move into proximity with one another, a user interface based on the aggregate profile may be presented. For example, two users may converge to a particular location in the facility standing next to an interface device. The inventory management system may use the interface device to present a user interface based on an aggregate profile of the profiles associated with the user identities of the two users.

In some implementations, as the user moves through the facility, the interface devices within a threshold distance of the user may be configured to provide user interfaces generated using the profile associated with that user's identity, either authenticated or unauthenticated. For example, wherever the user goes in the facility they will experience a user interface that is affected, at least in part, by their preferences as stored in the profile associated with them. Once the user is beyond the threshold distance from the interface device, that interface device may present a different user interface based on a different profile.

The facility may include a materials handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein allow the user interface presented to the user of the facility to be customized to the user, responsive to occurrences in the facility. The customization of the user interface may improve access to the facility or the items therein. As a result, the user experience of the users in the facility and overall operation of the inventory management system may be improved.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116 and totes 118 or other material handling apparatus may move within the facility 102. For example, the user 116 may move about within the facility 102 to pick or place the items 104 in various inventory locations 114, placing them on the tote 118 for ease of transport. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, imaging sensors, weight sensors, radio frequency (RF) receivers, temperature sensors, humidity sensors, vibration sensors, and so forth. The sensors 120 may be stationary or mobile, relative to the facility 102. For example, the inventory locations 114 may contain imaging sensors configured to acquire images of pick or placement of items 104 on shelves, of the users 116 in the facility 102, and so forth. In another example, the floor of the facility 102 may include weight sensors configured to determine a weight of the user 116 or other object thereupon. The sensors 120 are discussed in more detail below with regard to FIG. 2.

During operation of the facility 102, the sensors 120 may be configured to provide information suitable for tracking how objects move, or other occurrences within the facility 102. For example, a series of images acquired by an imaging sensor may indicate removal of an item 104 from a particular inventory location 114 by the user 116 and placement of the item 104 on or at least partially within the tote 118. The tote 118 is discussed in more detail below with regard to FIG. 5.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 are depicted functionally rather than schematically. For example, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

During use of the facility 102, the user 116 may move about the facility 102 to perform various tasks, such as picking or placing the items 104 in the inventory locations 114. The user 116 may benefit from presentation of information such as the pick list for that user 116, personal picking scores, compensation earned, total cost of the picked order, stock keeping unit (SKU), item name, description, packaging information, and so forth.

The inventory management system 122 may access or generate sensor data about the facility 102 and the contents therein including the items 104, the users 116, the totes 118, and so forth. The sensor data may be acquired by one or more of the sensors 120, data provided by other systems, and so forth. For example, the sensors 120 may include imaging sensors configured to acquire image data of scenes in the facility 102. The image data may be processed by the inventory management system 122 to determine a location of the user 116, the tote 118, identify the user 116, and so forth. The sensors 120 are discussed in more detail below with regard to FIG. 2.

The inventory management system 122, or systems coupled thereto, may be configured to determine an identity of the user 116. In one implementation, this determination may comprise comparing sensor data with previously stored identity data. Once identified, the identity of the user 116 may be authenticated. For example, the inventory management system 122 may receive a username and password and compare this to persistent identity data that has been previously stored. In other examples, the user 116 may be authenticated by showing their face to a facial recognition system, by presenting a token carrying authentication credentials, providing a fingerprint, and so forth.

Identity of the user 116 may be determined before, during, or after entry to the facility 102. Determination of the user's 116 identity may comprise associating the physical presence of the user 116 with identity data. For example, comparing images of facial features acquired from imaging sensors 120 with previously stored identity data describing those features.

In some implementations identification and authentication may occur contemporaneously or using the same set of operations. For example, the user 116 may approach a kiosk at an entrance to the facility 102 and enter a fingerprint at a fingerprint scanner. Based on a comparison of the fingerprint with previously stored data, the user 116 may be identified and authenticated.

Some users of the facility 102 may be unidentified during at least part of their use of the facility 102. For example, a previously unknown or new user 116 may enter the facility 102. In another example, confidence in a previously determined user identity may be lost, such as when sensor data is unavailable or the user 116 enters a crowd. The unidentified user 116 may be provided with a temporary user identity to distinguish the unidentified user 116, or data associated therewith, from other users 116. For example, identification of the user 116 associates the user 116 with particular user identity data and allows the inventory management system 122 to distinguish between users 116. The user identity data may be temporary or persistent. In comparison, authentication verifies or confirms veracity of the identification, at least to a threshold level of assurance. For example, the identity data for the transient user 116(1) may indicate a name "Temp123" while the identity data for the persistent user 116(2) may be "Albert". Continuing the example, authentication provides an assurance that the persistent user 116(2) is indeed the person associated with the name "Albert".

Occurrences involving the user 116 may be associated with the user identity, either persistent or temporary. The occurrence may involve the user 116 interacting with one or more items 104, such as picking, placing, and so forth. For example, the occurrence may comprise removing an item from the facility 102. Responsive to this occurrence, the inventory management system 122 may bill a financial account associated with the user identity for the cost of the item 104. Other occurrences may include one or more of speaking, reading, interaction with an inventory location 114, interaction with a tote 118, or presence of the user 116 at a particular location within the facility 102. The inventory management system 122 may be configured to determine the occurrences using the sensor data 120, based at least in part on human input, or a combination thereof. For example, the inventory management system 122 may prompt an employee of the facility 102 to provide input indicative of the language the user 116 is speaking.

The inventory management system 122 is configured to generate user interface data 124 based at least in part on profile data. One or more interface devices 126 may use the user interface data 124 to present a user interface 128 which may be perceived by the user 116. The user interface 128 may include one or more elements including visual, haptic, audible, olfactory, and so forth. The interface devices 126 are discussed in more detail below with regard to FIGS. 2 and 5.

The identity data, temporary or persistent, may be associated with profile data. The profile data may comprise information indicative of preferences as to the type of information presented, format of the presentation, preferred user interface theme, limits on presentation of public or confidential data, and so forth associated with the user 116. In some implementations, the profile may include information indicative of particular or special accommodations for the user 116. For example, the accommodations may indicate that the user 116 requires assistance lifting heavy objects, reaching inventory locations 114 above a certain height, is in a wheelchair, is visually impaired, is deaf, is unable to speak, and so forth. The profile data may be designated as transient, persistent, or aggregate. For example, the transient profile data may exist only for a particular session, such as while the user 116 is in the facility 102, and may be discarded after departure of the user 116. In another example, the persistent profile data may be retained for use at a later date. A transient profile may be converted or merged into a persistent profile. The aggregate profile may be generated using one or more transient profiles, persistent profiles, other aggregate profiles, or a combination thereof. In some implementations, the aggregate profile may be a composite of other profiles. The profile data is discussed in more detail below in FIG. 3.

The user interface data 124 may include information designating a particular interface device 126. For example, a particular interface device 126 in the facility 102 may be associated with a particular user 116. The particular interface device 126 may present the user interface 128 based on the profile data associated with the particular user 116. As a result, the user interface 128 as presented to the user 116 may be customized.

The user interface data 124 may comprise commands, instructions, tags, markup language, images, color values, text, or other data. For example, the user interface data 124 may be expressed as hypertext markup language (HTML), cascading style sheets (CSS), JavaScript, and so forth. In some implementations, the user interface data 124 may be rendered by the interface device 126 to present the user interface 128.

By using the inventory management module 122 to dynamically change the user interface 128 responsive to the profile data of the users 116, the overall user experience may be improved. For example, the user interface 128(1) presented on the interface device 126 may have a set of user interface elements specifically tailored to the user 116(1) based on the profile data of that user 116(1). Should another user 116(2) come along, the interface device 126 may present a different user interface 128(2) based on aggregate profile data.

Figure 2:
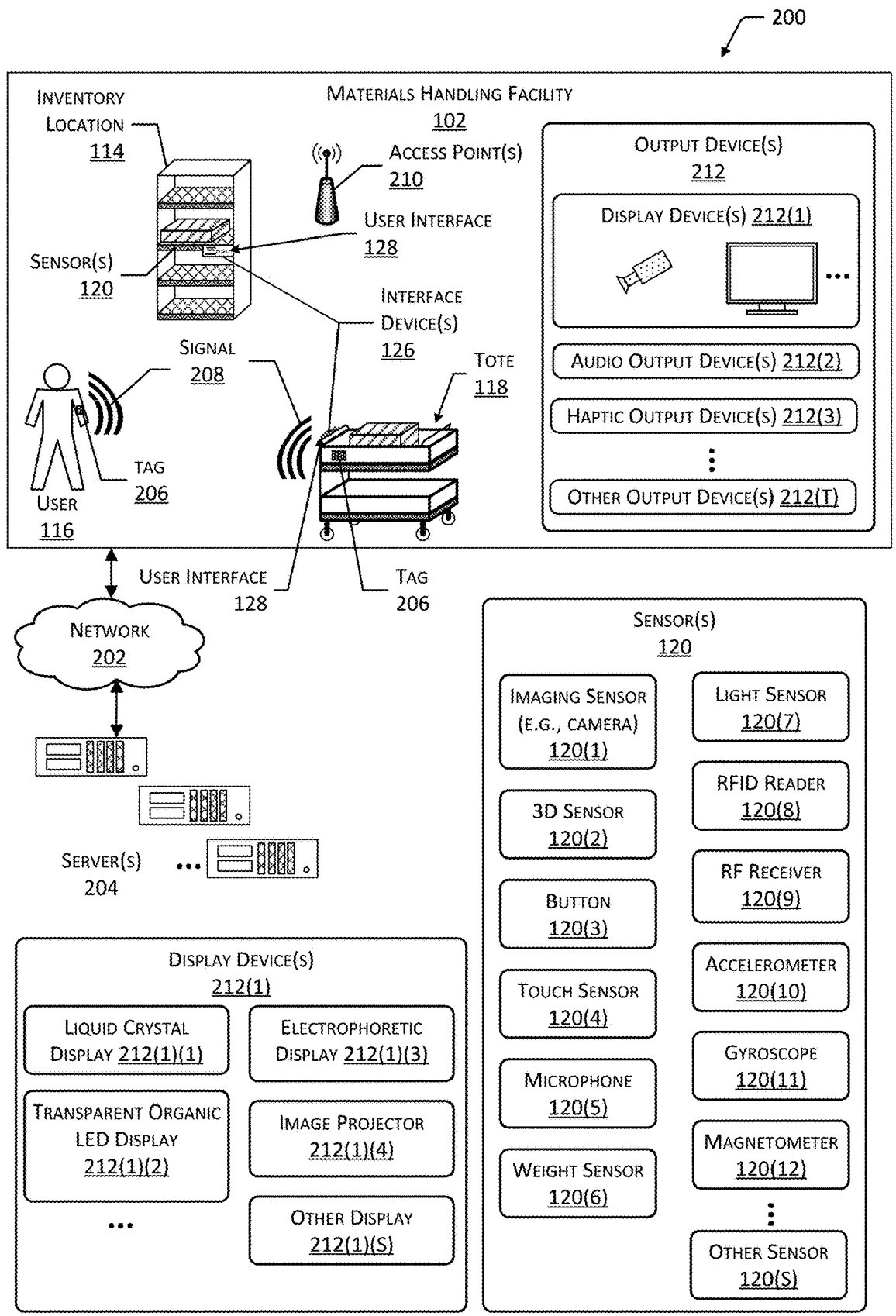
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations at least a portion of the servers 204 may be located at the facility 102. The servers 204 are discussed in more detail below with regard to FIG. 3.

The users 116, the totes 118, or other objects in the facility 102 may be equipped with one or more tags 206, such as radio frequency (RF) tags. The tags 206 may be configured to emit a signal 208. In one implementation, the tag 206 may be a radio frequency identification (RFID) tag configured to emit an RF signal 208 upon activation by an external signal. For example, the external signal may comprise a radio frequency signal or a magnetic field configured to energize or activate the RFID tag. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence. For example, an acoustic tag may be configured to generate an ultrasonic signal which is detected by corresponding acoustic receivers. In yet another implementation, the tag 206 may be configured to emit an optical signal.

The inventory management system 122 may be configured to use the tags 206 for one or more of identification of the object, determining a location of the object, and so forth. For example, the users 116 may wear tags 206, the totes 118 may have tags 206 affixed, and so forth which may be read and, based at least in part on signal strength, used to determine identity and location. The tote 118 is configured to carry or otherwise transport one or more items 104. For example, the tote 118 may include a basket, a cart, a bag, and so forth. The tote 118 is discussed in more detail below with regard to FIG. 5.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on the tote 118, in the interface device 126, may be carried or worn by the user 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, determine a location, and so forth based at least in part on their appearance within the image data.

One or more three-dimensional (3D) sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the three-dimensional data acquired to identify objects, determine a location of an object, and so forth. For example, the inventory management system 122 may determine operational data such as location in the facility 102 of the user 116 based at least in part on the location in three-dimensional space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The position within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment. In some implementations arrays of microphones 120(5) may be used. These arrays may implement beamforming techniques to provide for directionality of gain. The inventory management system 122 may use the one or more microphones 120(5) to acquire information from acoustic tags, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load due to gravity. The inventory management system 122 may use the data acquired by the weight sensors 120(6) to identify an object, determine a location of an object, maintain shipping records, identify the user 116, and so forth.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the user interface 128.

One more radio frequency identification (RFID) readers 120(8), near field communication (NFC) systems, and so forth may also be provided in the sensors 120. For example, the RFID readers 120(8) may be configured to read the tags 206. Information acquired by the RFID reader 120(8) may be used by the inventory management system 122 to identify an object associated with the tag 206 such as the item 104, the user 116, the tote 118, and so forth. For example, based on information from the RFID readers 120(8), a velocity of the tag 206 may be determined.

One or more RF receivers 120(9) may also be provided. In some implementations the RF receivers 120(9) may be part of transceiver assemblies. The RF receivers 120(9) may be configured to acquire RF signals 208 associated with Wi-Fi, Bluetooth, ZigBee, Z-Wave, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10), that may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth may be determined using the accelerometers 120(10).

A gyroscope 120(11) provides information indicative of rotation of an object affixed thereto. For example, the tote 118, the interface device 126, or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may be worn or carried by the user 116, mounted to the tote 118, the interface device 126, and so forth. For example, the magnetometer 120(12) mounted to the tote 118 may act as a compass and provide information indicative of which way the tote 118 is oriented.

The sensors 120 may include other sensors 120(S) as well. For example, the other sensors 120(S) may include proximity sensors, ultrasonic rangefinders, thermometers, barometric sensors, hygrometers, or biometric input devices including but not limited to fingerprint readers or palm scanners. For example, the inventory management system 122 may use information acquired from thermometers and hygrometers in the facility 102 to modify the user interface 128 to direct the user 116 to check on delicate items 104 stored in a particular inventory location 114.

The facility 102 may include one or more access points 210 configured to establish one or more wireless networks. The access points 210 may use Wi-Fi, near field communication (NFC), Bluetooth, or other technologies to establish wireless communications between a device and the network 202. The wireless networks allow the devices to communicate with one or more of the inventory management system 122, the sensors 120, the interface devices 126, the tag 206, a communication device of the tote 118, or other devices.

Output devices 212 may also be provided in the facility 102. The output devices 212 are configured to generate signals which may be perceived by the user 116. The output devices 212 may include display devices 212(1), audio output devices 212(2), haptic output devices 212(3), or other output devices 212(T).

The display devices 212(1) may be configured to provide output which may be seen by the user 116, or detected by a light-sensitive detector such as an imaging sensor 120(1) or light sensor 120(7). The output may be monochrome or color. The display devices 212(1) may be emissive, reflective, or both. An emissive display device 212(1) is configured to emit light during operation. For example, a light emitting diode (LED) is an emissive visual display device 212(1). In comparison, a reflective display device 212(1) relies on ambient light to present an image. For example, an electrophoretic display 212(1)(3) is a reflective display device 212(1). Backlights or front lights may be used to illuminate the reflective visual display device 212(1) to provide visibility of the information in conditions where the ambient light levels are low.

Mechanisms of the display devices 212(1) may include liquid crystal displays 212(1)(1), transparent organic light emitting diodes (LED) 212(1)(2), electrophoretic displays 212(1)(3), image projectors 212(1)(4), or other displays 212(1)(S). The other displays 212(1)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 212(1) may be configured to present images. For example, the display devices 212(1) may comprise a pixel-addressable display. The image may comprise at least a two-dimensional array of pixels, or a vector representation of an at least two-dimensional image.

In some implementations, the display devices 212(1) may be configured to provide non-image data, such as text characters, colors, and so forth. For example, a segmented electrophoretic display 212(1)(3), segmented LED, and so forth may be used to present information such as a SKU number. The display devices 212(1) may also be configurable to vary the color of the text, such as using multicolor LED segments.

In some implementations, display devices 212(1) may be configurable to provide image or non-image output. For example, an electrophoretic display 212(1)(3) with addressable pixels may be used to present images of text information, or all of the pixels may be set to a solid color to provide a colored panel.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to: voice coils, piezoelectric elements, magnetostrictive elements, or electrostatic elements, and so forth. For example, a piezoelectric buzzer or a speaker may be used to provide acoustic output.

Haptic output devices 212(3) are configured to provide a signal which results in a tactile sensation to the user 116. The haptic output devices 212(3) may use one or more mechanisms such as electrical stimulation or mechanical displacement to provide the signal. For example, the haptic output devices 212(3) may be configured to generate a modulated electrical signal which produces an apparent tactile sensation in one or more fingers of the user 116. In another example, the haptic output devices 212(3) may comprise piezoelectric or rotary motor devices configured to provide a vibration which may be felt by the user 116.

The interface device 126 may include the sensors 120, the output devices 212, or both. In some implementations, the interface device 126 may include hardware processors, memory, and other elements configured to accept and process the user interface data 124 to present the user interface 128, process input for the user interface 128, and so forth.

Other output devices 212(T) may also be present. For example, the output devices 212(T) may include scent/odor dispensers, document printers, three-dimensional printers or fabrication equipment, and so forth.

The inventory management system 122 may generate the user interface data 124 which is then used by the interface device 126 to present the user interface 128. The user interface 128 may be configured to stimulate one or more senses of the user 116. For example, the user interface 128 may comprise visual, audible, and haptic output.

Figure 3:
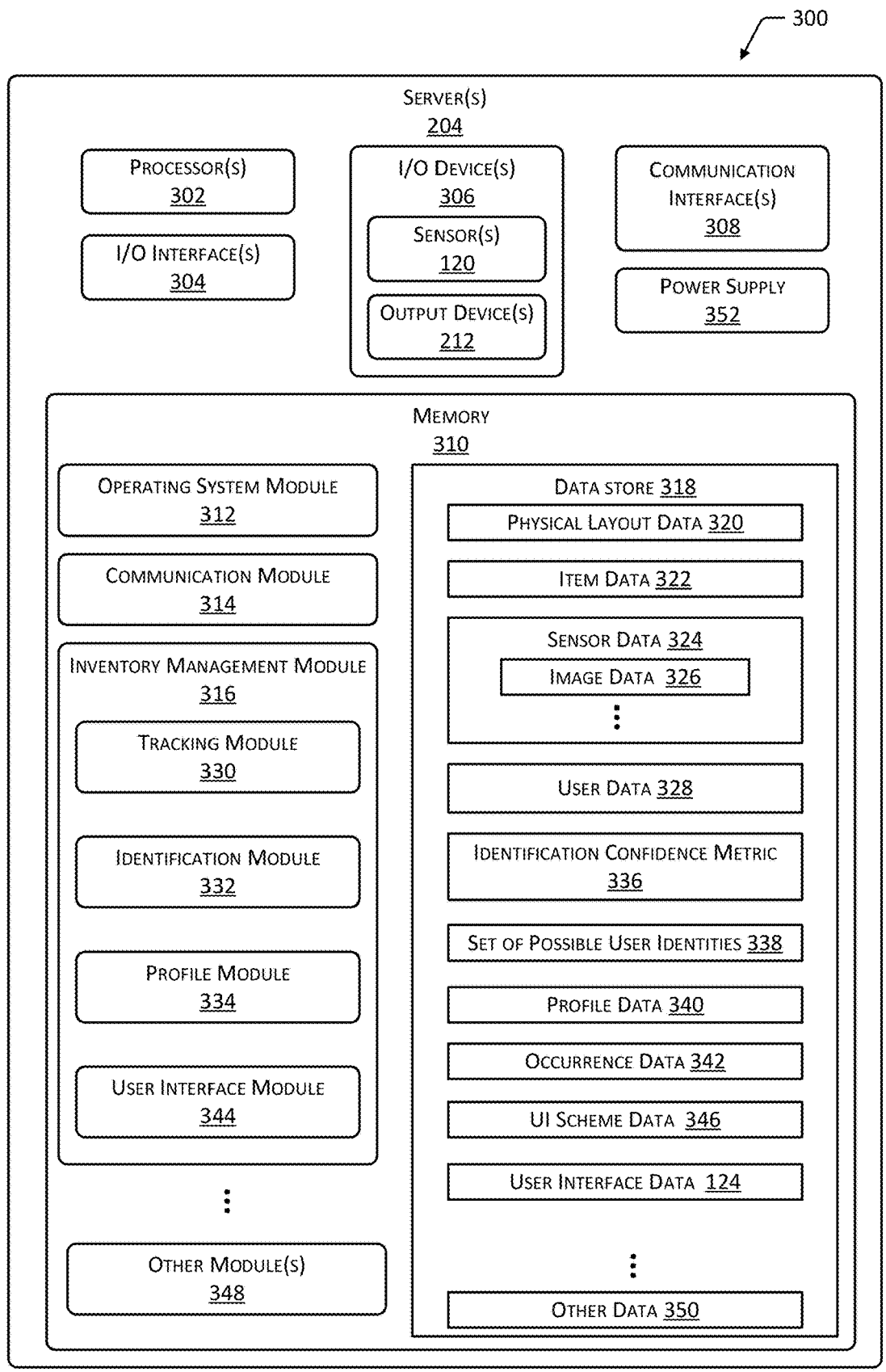
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as the sensors 120, one or more of a keyboard, mouse, scanner, and so forth. The I/O devices 306 may also include output devices 212 such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, the interface devices 126, routers, the access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project, other UNIX or UNIX-like variants, a variation of the Linux operating system as promulgated by Linus Torvalds, the Windows Server operating system from Microsoft Corporation of Redmond, Washington, and so forth.

Also stored in the memory 310 may be one or more of the following modules. These modules may be executed as foreground applications, background tasks, daemons, and so forth.

A communication module 314 may be configured to establish communications with one or more of the sensors 120, one or more of the interface devices 126, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track movement of items 104 in the facility 102, generate user interface data 124, and so forth.

The inventory management module may access information stored in a data store 318 in the memory 310. The data store 318 may use a flat file, database, linked list, tree, executable code, script, or other data structure to store the information. In some implementations, the data store 318 or a portion of the data store 318 may be distributed across one or more other devices including other servers 204, network attached storage devices, and so forth.

The data store 318 may include physical layout data 320. The physical layout data 320 provides a mapping of physical locations within the facility 102 of devices and objects such as the sensors 120, inventory locations 114, and so forth. For example, the physical layout data 320 may indicate the coordinates within the facility 102 of an inventory location 114, an RFID reader 120(8) close to that inventory location 114, and so forth. In some implementations, the inventory management module 316 may access the physical layout data 320 to determine a distance between two objects, such as the user 116 and an interface device 126.

The item data 322 comprises information associated with the items 104. The information may include information indicative of one or more inventory locations 114 at which one or more of the items 104 are stored. The item data 322 may also include order data, SKU or other product identifier, price, quantity on hand, weight, expiration date, images of the item, detail description information, ratings, ranking, and so forth. The inventory management module 316 may store information associated with inventory management functions in the item data 322.

The data store 318 may also include sensor data 324. The sensor data 324 comprises information acquired from, or based on, the one or more sensors 120. For example, the sensor data 324 may comprise three-dimensional information about an object in the facility 102. As described above, the sensors 120 may include an imaging sensor 120(1) which is configured to acquire one or more images. These images may be stored as the image data 326. The image data 326 may comprise information descriptive of a plurality of picture elements or pixels.

User data 328 may also be stored in the data store 318. The user data 328 may include identity data, information indicative of a profile, purchase history, location data, demographic data, and so forth. The user data 328 is discussed in more detail below with regard to FIG. 4. Individual users 116 or groups of users 116 may selectively provide user data 328 for use by the inventory management system 122, or may authorize collection of the user data 328 during use of the facility 102 or access to user data 328 obtained from other systems. For example, the user 116 may opt-in to collection of the user data 328 to receive enhanced services while using the facility 102.

The inventory management module 316 may include one or more of a tracking module 330, identification module 332, or profile module 334. The tracking module 330 may be configured to track one or more objects associated with the facility 102. For example, the tracking module 330 may access the sensor data 324 to determine the location of the items 104, the user 116, the totes 118, and so forth within the facility 102.

The tracking module 330 may determine a distance between objects in the facility 102. For example, the tracking module 330 may determine a distance between the first user 116(1) and the second user 116(2), the interface device 126, and so forth. The distance between the two objects may be calculated using the location data for the object, physical layout data 320, and so forth.

The identification module 332 is configured to identify an object. In one implementation, the identification module 332 may be configured to identify an item 104. In another implementation, the identification module 332 may be configured to identify the user 116. For example, the identification module 332 may use facial recognition techniques to process the image data 326 and determine the identity data of the user 116 depicted in the images by comparing the characteristics in the image data 326 with previously stored values. The identification module 332 may also access data from other sensors 120, such as from the RFID reader 120(8), the RF receiver 120(9), fingerprint sensors, and so forth.

The identification module 332 may also be configured to authenticate the identity of the user 116. Authentication may comprise a determination that the veracity or accuracy of the identification is accurate at least to an acceptable level of assurance. Authentication may use one or more factors, with multi-factor authentication providing a greater level of assurance as to the identity. For example, multi-factor authentication of the identity may be determined at least in part from data received from a tag 206 carried by the user 116, input of a password, a fingerprint, and so forth. This data may be compared with previously stored data in the user data 328.

In some implementations identification and authentication may be combined into a single operation or set of operations. For example, the identification module 332 may use manual entry by the user 116 into an interface device 126 of a username and password to both identify and authenticate the user 116.

In some implementations the identification module 332 may provide an identification confidence metric 336. The identification confidence metric 336 may be stored in the data store 318. The identification confidence metric 336 may indicate the confidence in the determination of the identity of the user 116, or an estimate of the accuracy of the identification. For example, the identification confidence metric 336 may indicate a low value after identifying the user 116 based on facial recognition using image data 326 acquired at a distance from the user 116. In comparison, the identification confidence metric 336 may be a relatively high value after the user 116 has performed a multifactor authentication including entry of a username and password, entry of a fingerprint, presentation of the physical token such as a tag 206, and so forth.

The identification confidence metric 336 may be generated or updated at various times during operation of the facility 102. For example, the identification confidence metric 336 may be recalculated after two users 116 approach within a threshold distance of one another. Continuing the example, the identification confidence metric 336 may decrease after a plurality of users 116 crowd together in close proximity to one another.

The identification module 332 may be configured to determine the identity data of the user 116 subsequent to the identification confidence metric 336 dropping below a threshold value. Continuing the example above, the decrease of the identification confidence metric 336 below a threshold value may result in the identification module 332 attempting to re-identify the user's 116 identity data. In one implementation, the identification module 332 may generate a set of possible user identities 338. The set of possible user identities 338 may vary in scope. For example, the set of possible user identities 338 may include all user identities previously stored.

In another implementation, the set of possible user identities 338 may comprise the user identities of users 116 within a threshold distance of a given user 116 or particular location. For example, the identification confidence metric 336 of user 116(1) drops below a threshold value at a time "t". Using a last known location of the user 116(1), the identification module 332 may generate the set of possible user identities 338 from the identity data of the users 116(2)-(U) that are within 3 meters of the last known location at time "t". In one implementation, the tracking module 330 may provide the location data used by the identification module 332 to determine the set of possible user identities 338.

The identification module 332 may also operate in conjunction with the user interface module 344 to determine the identity of the user. In one implementation, the user interface module 344 may be configured to generate user interface data 124 that incorporates information from the profile data 340 of one or more of the set of possible user identities 338. Different user interfaces 128 based on this different information may be presented, and the interaction of the user 116 with a particular user interface 128 may be used, at least in part, to determine the identity of the user 116. For example, the user 116 may be associated with persistent profile data indicating a language preference of French. Should the identification confidence metric 336 of the user 116 drop below a particular threshold value, the user 116 may be presented with the first user interface 128(1) that uses English, and a second user interface 128(2) that uses French.

The sensor data 324 may be used to determine a direction of the gaze of the eyes of the user 116. The tracking module 330 may detect that the gaze of the user 116 dwells for a greater time on the French second user interface 128(2) compared to the English first user interface 128(1). Based at least in part on this information, the identification module 332 may draw an inference that the user 116 prefers French. The identification module 332 may then remove all of the user identities from the set of possible user identities 338 that list English as a preferred language. As a result, the set of possible user identities 338 may be reduced in size. In conjunction with the other modules in the system, additional variations on the user interface 128 may be presented to further reduce the set of possible user identities 338 to a single user 116 identity.

The profile module 334 is configured to access, generate, or otherwise manipulate profile data 340. The profile data 340 may comprise information indicative of preferences associated with the operation of the interface devices 126, the user interface 128, or both. The profile data 340 may include transient profile data, persistent profile data, or aggregate profile data, as discussed in more detail below with regard to FIG. 4.

The profile module 334 may generate occurrence data 342. For example, the profile module 334 may access the sensor data 324 to generate the occurrence data 342. The occurrence data 342 provides information indicative of one or more occurrences involving the user 116 as associated with the facility 102. For example, the occurrence data 342 may provide information about interactions between the user 116 and one or more of other users 116, or objects of the facility 102. In another example, the occurrence data 342 may be indicative of activities by the user 116 such as reading, speaking, and so forth.

The profile module 334 may use the occurrence data 342, the sensor data 324, or other data to generate or update profile data 340. For example, the occurrence data 342 may indicate that the user 116 is speaking aloud in French. Based at least in part on the occurrence data 342, the profile module 334 may change a language preference from "English" to "French" for the profile data 340 associated with the user 116. One or more heuristics or machine learning techniques may be used to determine the occurrence data 342, and otherwise generate the profile data 340. For example, an artificial neural network may be used to determine an occurrence has taken place.

The profile module 334 may be configured to generate the aggregate profile data. In one implementation, the profile module 334 may accept as input profile data 340 such as one or more of the transient profile data, the persistent profile data, or the aggregate profile data associated with one or more users 116. Information from the profile data 340 may be combined, analyzed, or otherwise used to generate the aggregate profile data. For example, the volume settings associated with each of the different profile data 340 may be processed using one or more statistical techniques, such as determining a median volume setting. The median volume setting may be used in the aggregate profile data. In another example, a count may be used such that the aggregate profile data may use a setting as configured by a majority of the input profiles. In yet another example, any appearance of the particular data value may be incorporated into the aggregate profile data. Continuing this example, three users 116(1)-(3) may have a language preference of "English" while a fourth user 116(4) may have a language preference of "French". The aggregate profile data may be configured to use English as a primary user interface language, but also provide at least some of the user interface 128 using "French".

The profile module 334 may be configured to resolve conflicts between the profile data 340 used as an input to generate the aggregate profile data. In one implementation, the profile module 334 may select a less restrictive or more inclusive option out of those in use by the input profile data 340. For example, one of the input profile data 340 may indicate an accommodation for a visually impaired user 116, such as preferring audible user interfaces, or large font sizes on high-contrast backgrounds. As a result, the aggregate profile data may be configured to provide audible output suitable for use by the visually impaired user 116 as well as visual output for non-visually impaired users 116.

The profile module 334 may operate in conjunction with the other modules. For example, the identification module 332 may provide user data 328 such as identity data to the profile module 334. The profile module 334 may use the identification data to retrieve profile data 340 associated with the user identity.

The user interface module 344 is configured to generate user interface data 124. The user interface data 124 may include or be based at least in part on the profile data 340, as well as information which is to be presented. Information to be presented may be provided by the inventory management system 122 or other systems. For example, the information may include a list of the items 104 to be picked, details about the items 104, performance metrics of the user 116, and so forth. As described above, the user interface data 124 is configured to provide, when rendered or otherwise processed, the user interface 128 by way of one or more interface devices 126.

The user interface module 344 may generate user interface data 124 based at least in part on information provided by the tracking module 330. For example, the tracking module 330 may provide information indicative of distances between the interface devices 126 and the user 116. Based on this distance data, the user interface module 344 may designate user interface data 124 for presentation using particular interface devices 126 that are within a threshold distance of the user 116.

The user interface module 344 may use the aggregate profile data in situations where a single user 116 is unauthenticated. For example, the identification module 332 has determined that the identification confidence metric 336 for a particular user 116 has dropped below a threshold value and thus the identity of the user 116 is in question. Continuing the example, the user interface module 344 may generate the user interface data 124 based on aggregate profile data that is derived from a least a portion of the profile data 340 associated with the set of possible user identities 338. Once the identification module 332 has determined that the identification confidence metric 336 of the particular user 116 has reached or exceeded the threshold, the profile data 340, such as a transient profile data or persistent profile data associated with the particular user 116, may be used to generate the user interface data 124.

The user interface module 344 may use the aggregate profile data in situations where a plurality of users 116 is using a common interface device 126. For example, the four users 116(1)-(4) may be standing close to one another and near an interface device 126. Each of the four users 116(1)-(4) may or may not be authenticated by the identification module 332, but each may have a profile associated therewith. For example, the user 116(1) may be unauthenticated (for example, temporary identification data may be assigned to the user 116(1)) and associated with transient profile data. Continuing the example, the users 116(2)-(4) may be authenticated and associated with transient profile data, persistent profile data, aggregate profile data, or a combination thereof. The profile module 334 may be configured to generate aggregate profile data using the profile data 340 associated with users 116(1)-(4). For example, the aggregate profile data may select as the language data the language in use by the majority of the users 116. The aggregate profile data may then be used to generate the user interface data 124 for presentation of the user interface 128 on the interface device 126.

In one implementation, the user interface module 344 may access UI scheme data 346. The UI scheme data 346 provides one or more settings or other information configured to define a particular user interface scheme or "skin". For example, the UI scheme data 346 may comprise a set of particular icons, particular palette of colors, and so forth. In some implementations, different UI scheme data 346 may include or exclude particular elements or data fields. For example, the first UI scheme data 346(1) may set forth a particular color palette wherein the graphical elements are predominantly blue on white and presenting a SKU number, while the second UI scheme data 346(2) may set forth a particular color palette where the graphical elements are predominantly purple on yellow and omitting the SKU number.

Other modules 348 may also be present in the memory 310. For example, a pick statistics module may be configured to generate information indicative of pick error rates of the user 116. Other data 350 may also be stored in the data store 318. For example, the other data 350 may comprise picking statistics, threshold values, and so forth.

The server 204 may also include a power supply 352. The power supply 352 is configured to provide electrical power suitable for operating the components in the server 204.

Figure 4:
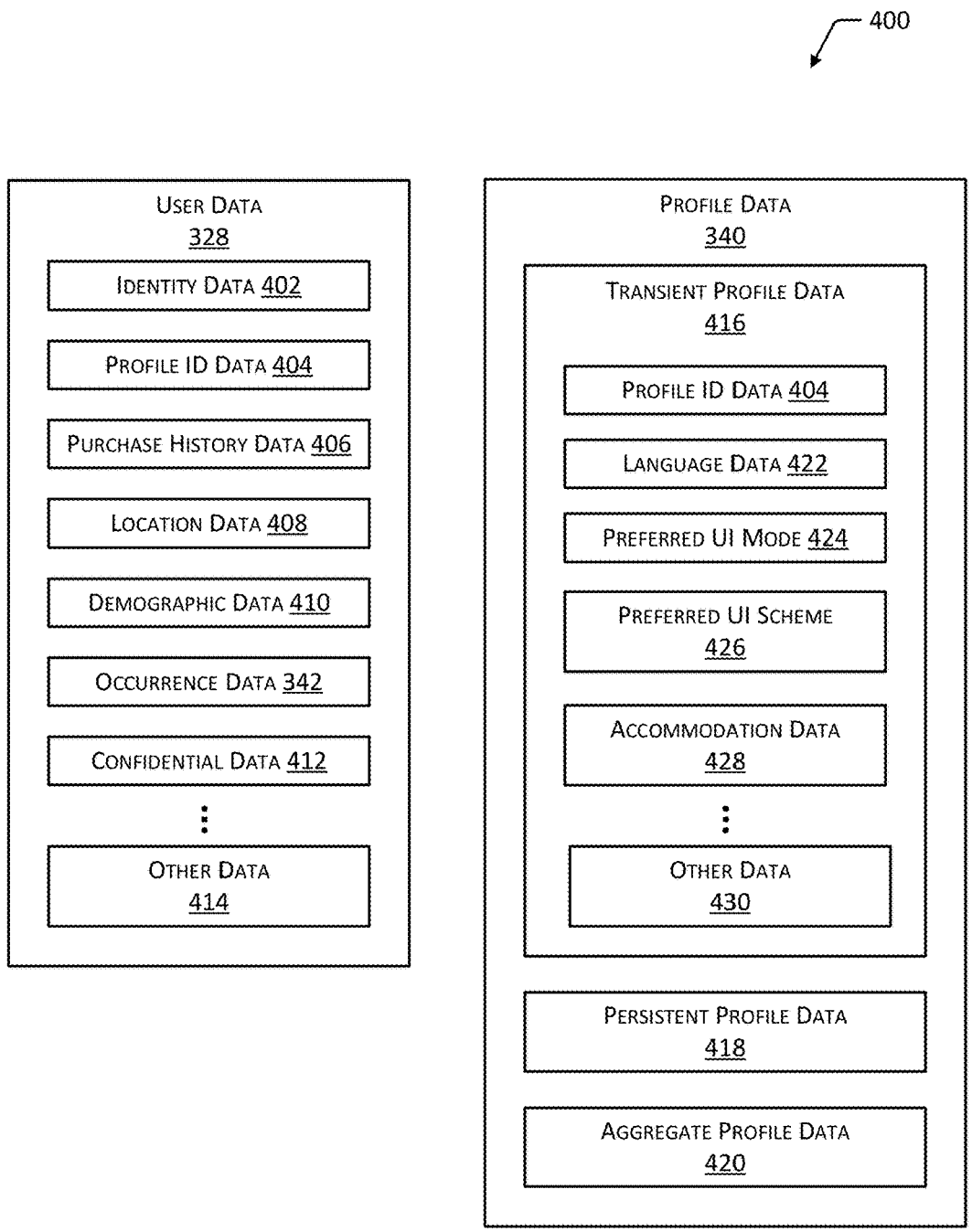
FIG. 4 illustrates a block diagram of data that may be used by the server to support operation of the facility, according to some implementations.

FIG. 4 illustrates a block diagram 400 of data that may be used by the server 204 to support operation of the facility 102, according to some implementations. As described above, the data store 318 may store one or more of the user data 328 or the profile data 340.

The user data 328 may include identity data 402. The identity data 402 provides information indicative of an identity of the user 116. The identity data 402 may specify a user name, account number, government issued identification string, biometric values of the user 116, and so forth. The identity data 402 may be categorized as temporary or persistent. For example, the identity data 402 may comprise a temporary identity or identification number issued to an unauthenticated user 116. In comparison, the identity data 402 that remains associated with the same user 116 over a period of time, such as an employee identification number, may be considered persistent.

The identification module 332 may determine the user identity by analyzing characteristics of the user 116, such as facial characteristics, fingerprint characteristics, iris characteristics, and so forth and comparing this information with previously stored identity data 402. Continuing the example, the identification module 332 may use facial recognition techniques to process the image data 326 and determine the identity data 402 of the user 116 depicted in the images by comparing the characteristics in the image data 326 with previously stored values. In some implementations, the identity data 402 may distinguish one user 116 from another without further information. For example, the identity data 402 may distinguish user 116(1) from user 116(2), but may omit information such as real or legal names of each.

The identity data 402 may be used to authenticate the identity of the user 116. For example, the identification module 332 may be configured to authenticate the identity of the user 116 by comparing sensor data 324 with previously stored information in the user data 328.

The user data 328 may include profile identification ("ID") data 404. The profile ID data 404 comprises information indicative of profile data 340 associated with the particular user 116.

The user data 328 may also include purchase history data 406. The purchase history data 406 provides information indicative of one or more purchases or other transactions involving items 104 or services that the user 116 has acquired some rights to.

The user data 328 may also include location data 408. In some implementations, the location data 408 may be generated, at least in part, by the tracking module 330. The location data 408 provides information indicative of a location of an object, such as the item 104, the user 116, the tote 118, and so forth. The location may be absolute with respect to the facility 102, or relative to another object or point of reference. Absolute terms may comprise a latitude, longitude, and altitude with respect to a geodetic reference point. Relative terms may include a location of 25.4 m along an x-axis and 75.2 m along a y-axis as designated by a floor plan of the facility 102, 5.2 m from an inventory location 114 along a heading of 169°, and so forth. For example, the location data 408 may indicate that the user 116(1) is 25.2 m along the aisle 112(1) and standing in front of the inventory location 114(47). In comparison, a relative location may indicate that the user 116 is 32 cm from the tote 118 at a heading of 73° with respect to the tote 118. The location data 408 may include orientation information, such as which way the user 116 is facing. The orientation may be determined by the relative direction the user's body is facing. In some implementations, the orientation may be relative to the interface device 126. Continuing the example, the location data 408 may indicate that the user 116(1) is oriented with a heading of 0°, or looking north. In another example, the location data 408 may indicate that the user 116 is facing towards the interface device 126.

Demographic data 410 may be stored in the user data 328. The demographic data 410 may provide information such as age, occupation, credit rating, home address, and so forth. In some implementations, the demographic data 410 may include information generated, at least in part, by one or more other modules. For example, an age estimation module may be configured to provide an estimated age of the user 116. The estimated age may then be stored as part of the demographic data 410, such as in transient profile data.

The occurrence data 342 may also be included with, or associated with, the user data 328. The occurrence data 342 provides information indicative of one or more occurrences involving the user 116. For example, the occurrence data 342 may indicate that the user 116 was speaking, reading, removing an item 104 from an inventory location 114, placing an item 104 in an inventory location 114, placing the item 104 within the tote 118, and so forth. The occurrence data 342 may include information about a user's 116 position, pose, and so forth. For example, the occurrence data 342 may include information indicating that the user 116 is pointing at a particular inventory location 114, looking at one or more of a particular inventory location 114 or item 104, and so forth. The occurrence data 342 may also include information about access by the user 116 to one or more of the interface devices 126. For example, the occurrence data 342 may indicate that the user 116 has provided input to a particular interface device 126.

The user data 328 may also include confidential data 412. For example, the confidential data 412 may include payment information such as bank account numbers. In some implementations, one or more of the previously described pieces of information in the user data 328 may be designated as confidential. For example, the real name and the home address of the user 116 as stored in the demographic data 410 may be designated as confidential data 412.

The user data 328 may also include other data 414. For example, the other data 414 may include a unique identifier indicative of a particular tote 118 used by the user 116 at the facility 102.

The profile data 340 may also be stored in the data store 318 as described above. The identity data 402 of a particular user 116 may be associated with one or more profiles as described by the profile data 340. The profile data 340 may include one or more of transient profile data 416, persistent profile data 418, or aggregate profile data 420.

The transient profile data 416 may exist for a limited duration of time, scope, and so forth. For example, the transient profile data 416 may be discarded or erased after the user 116 it is associated with leaves the facility 102. In some implementations, the transient profile data 416 may be converted to, merged with, or otherwise used to modify persistent profile data 418. For example, transient profile data 416 may be created for an unauthenticated user 116 indicating a language preference for "French". After authenticating the user 116, the language preference for "French" may replace a previous language preference in the persistent profile data 418 associated with the identity data 402 of the user 116, as now authenticated.

The persistent profile data 418 may be stored and available for use at a later time. For example, the persistent profile data 418 may be retained in the data store 318 after the user 116 leaves the facility 102.

The aggregate profile data 420 may comprise information obtained from one or more other profile data 340. For example, the aggregate profile data 420 may be generated using values obtained from one or more of transient profile data 416, persistent profile data 418, or aggregate profile data 420.

The profile data 340 may include a profile identifier ("ID") data 404. For example, the profile ID data 404 may be used to distinguish one profile from another. The profile data 340 may include other information including but not limited to language data 422, preferred UI mode 424, preferred UI scheme 426, accommodation data 428, or other data 430.

The language data 422 may indicate a preference for language to use in communicating with the user 116. The language data 422 may indicate a spoken language preference, written language preference, or both.

The preferred UI mode 424 may designate one or more of visual, audible, or haptic output that is preferred for consumption by the user 116. For example, the preferred UI mode 424 may indicate that the user 116 prefers a visual output compared to audible output.

The preferred UI scheme 426 may provide information indicative of particular UI scheme data 346. For example, the preferred UI scheme 426 may comprise data indicating that the user 116 prefers the UI scheme data 346 that includes a color palette of yellow letters on purple background.

The accommodation data 428 provides information about one or more accommodations that the user 116 may require to utilize the facility 102. For example, the accommodation data 428 may indicate that the user 116 requires assistance lifting heavy objects, reaching high shelves, uses a wheelchair or other mobility-enhancing device, is visually impaired, is deaf, has a service animal, and so forth.

The other data 430 may include information such as preferred time duration to present information, preferred scroll rate of text in the user interface 128, and so forth.

While the various data described previously is depicted within the transient profile data 416, the persistent profile data 418 or the aggregate profile data 420 may each include at least a portion of one or more of the data described. For example, the persistent profile data 418 may include the profile ID data 404, the language data 422, the preferred UI mode 424, the preferred UI scheme 426, the accommodation data 428, and so forth.

Figure 5:
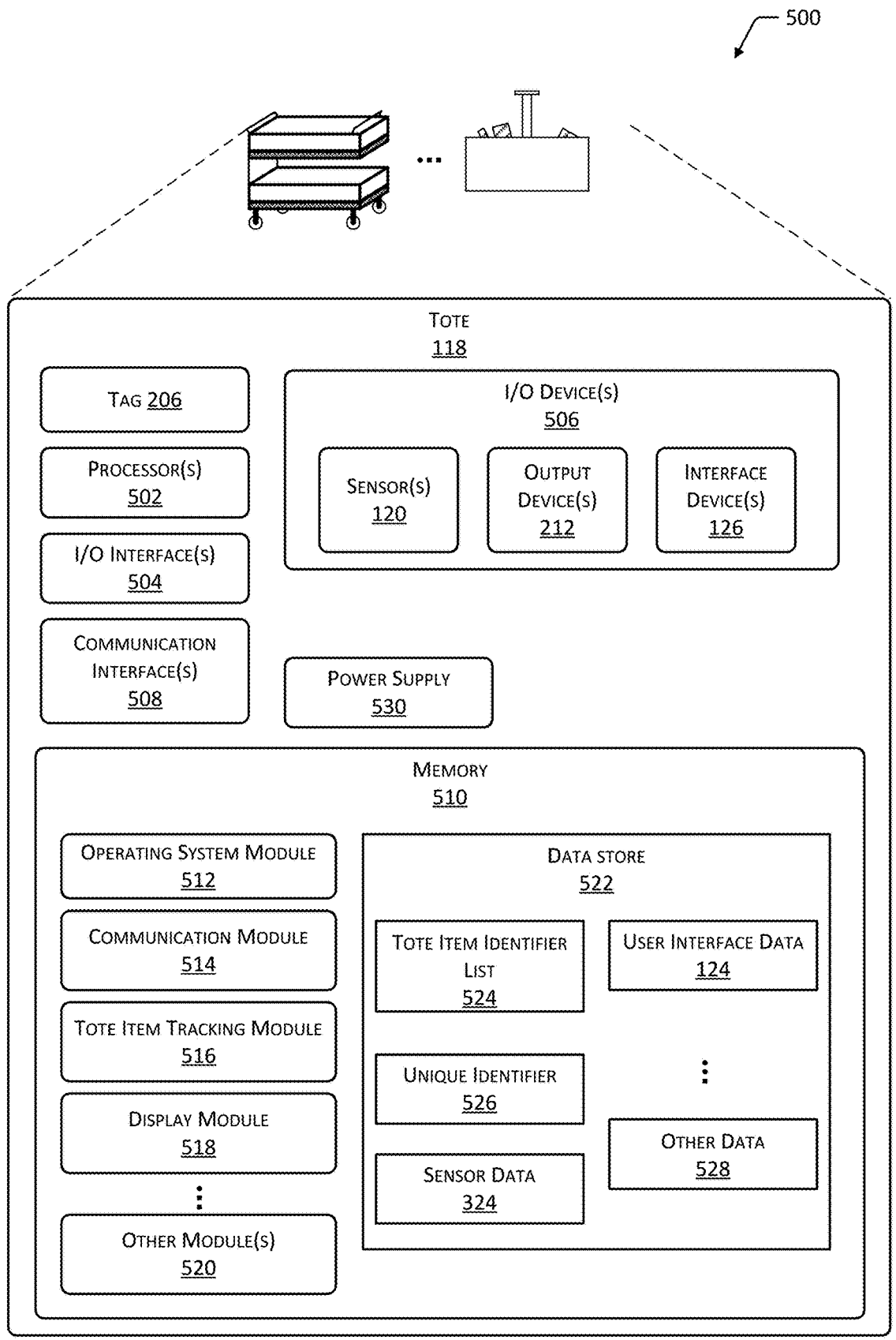
FIG. 5 is a block diagram of a tote, according to some implementations.

FIG. 5 illustrates a block diagram 500 of the tote 118, according to some implementations. The tote 118 may include several form factors such as a wheeled cart, hand-carried cart, bag, and so forth. For example, the tote 118 may include a plurality of wheels enabling the tote 118 to be moved within the facility 102.

The tote 118 may include a tag 206. The tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118.

The tote 118 may include one or more hardware processors 502 (processors) configured to execute one or more stored instructions. The processors 502 may comprise one or more cores. The tote 118 may include one or more I/O interface(s) 504 to allow the processor 502 or other portions of the tote 118 to communicate with other devices. The I/O interfaces 504 may include I2C, SPI, USB, RS-232, and so forth.

The I/O interface(s) 504 may couple to one or more I/O devices 506. The I/O devices 506 may include one or more of the input devices such as the sensors 120. As described above, the sensors 120 may include imaging sensors 120(1), weight sensors 120(6), RFID readers 120(8), and so forth. The I/O devices 506 may also include output devices 212 such as display devices 212(1), audio output devices 212(2), haptic output devices 212(3), and so forth.

The I/O devices 506 may include interface devices 126. The interface device 126 may include an input device such as a sensor 120, an output device 212, or a combination of both. For example, a touchscreen display interface device 126 may incorporate a touch sensor 120(4) and a display device 212(1). In some embodiments, the I/O devices 506 may be physically incorporated with the tote 118 or may be externally placed.

The tote 118 may also include one or more communication interfaces 508. The communication interfaces 508 are configured to provide communications between the tote 118 and other devices, such as other totes 118, interface devices 126, routers, access points, the servers 204, and so forth. The communication interfaces 508 may include devices configured to couple to PANs, LANs, WANs, and so forth. For example, the communication interfaces 508 may include devices compatible with Ethernet, Wi-Fi, Bluetooth, ZigBee, Z-Wave, 3G/4G/LTE, and so forth.

The tote 118 may also include one or more busses or other internal communications hardware or software that allow for the transfer of data between the various modules and components of the tote 118.

As shown in FIG. 5, the tote 118 includes one or more memories 510. The memory 510 comprises one or more CRSM as described above. The memory 510 provides storage of computer readable instructions, data structures, program modules and other data for the operation of the tote 118. A few example functional modules are shown stored in the memory 510, although the same functionality may alternatively be implemented in hardware, firmware, or as a SOC.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. The OS module 512 may implement a variant of the FreeBSD operating system as promulgated by the FreeBSD Project, other UNIX or UNIX-like variants, a variation of the Linux operating system, such as Android as promulgated by Google, Inc. of Mountain View, California. Other OS modules 512 may be used, such as the Windows operating system from Microsoft Corporation of Redmond, Washington, the LynxOS from LynxWorks of San Jose, California, and so forth.

Also stored in the memory 510 may be one or more of the following modules. These modules may be executed as foreground applications, background tasks, daemons, and so forth.

A communication module 514 may be configured to establish communications with one or more of the sensors 120, interface devices 126, the servers 204, or other devices. The communications may be authenticated, encrypted, and so forth.

The memory 510 may also store a tote item tracking module 516. The tote item tracking module 516 is configured to maintain a list of items 104, which are associated with the tote 118. For example, the tote item tracking module 516 may receive input from a user 116 by way of a touch screen display with which the user 116 may enter information indicative of the item 104 placed in the tote 118. In another example, the tote item tracking module 516 may receive input from the I/O devices 506, such as the weight sensor 120(6) and an RFID or NFC reader 120(8). The tote item tracking module 516 may send the list of items 104 to the inventory management system 122. The tote item tracking module 516 may also be configured to receive information from the inventory management system 122. For example, a list of items 104 to be picked may be presented within a user interface 128 on the display device 212(1) of the tote 118.

The memory 510 may include a display module 518. The display module 518 may be configured to present information, such as received from the one or more servers 204 or generated onboard the tote 118, using one or more of the interface devices 126. For example, the display module 518 may comprise a rendering engine configured to process the user interface data 124 received from the server 204 to generate the user interface 128. In some implementations, the display module 518 may also process input made to the user interface 128 by way of the input devices. In another implementation, the display module 518 may provide one or more of the functions described above with regard to the inventory management module 316.

Other modules 520 may also be stored within the memory 510. In one implementation, a data handler module may be configured to generate data indicative of the user 116, the tote 118, or another of one or more objects in range of the sensors 120 of the tote 118. For example, the data handler module may be configured to acquire and provide the tote item identifier list 524 to the inventory management module 316 of the server 204. The identification module 332 may use information in the tote item identifier list 524 to determine the identity of the user 116. Continuing the example, the set of items 104 in the tote 118 as picked by the user 116 may be unique at a particular instant in time in the facility 102. By comparing the tote item identifier list 524 with a list of items previously picked by users 116 of the facility 102, it may be possible to determine identity of the user 116 associated with the tote 118. For example, previously acquired user data 328 may indicate that the user identity associated with the user 116(1) has placed an item 104 comprising pickled artichokes into the tote 118(1). Should the identity of the user 116(1) become ambiguous or uncertain at a later time, the contents of the tote 118 in combination with the proximity of the user 116(1) to the tote 118(1) may be used, at least in part, to establish the identity data of the user 116(1).

The profile module 334 may use information acquired from the tote 118 to generate the occurrence data 342. For example, the sensor data 324 received from sensors 120 onboard the tote 118 may be used to determine one or more occurrences. Continuing the example, the sensor data 324 may indicate that the user 116 is speaking. In another example interaction between the user 116 of the tote 118 and the interface device 126 may provide occurrence data 342. For example, the user 116 changing a preference in the user interface 128 may generate occurrence data 342. The profile module 334 may use the occurrence data 342 to generate or modify the profile data 340 associated with the user 116.

The other modules 520 may also include a user authentication module which may be configured to receive input and authenticate or identify a particular user 116. For example, the user 116 may enter a personal identification number or may provide a fingerprint to the fingerprint reader to establish their identity.

The memory 510 may also include a data store 522 to store information. The data store 522 may use a flat file, database, linked list, tree, executable code, script, or other data structure to store the information. In some implementations, the data store 522 or a portion of the data store 522 may be distributed across one or more other devices including the servers 204, other totes 118, network attached storage devices and so forth.

The data store 522 may store a tote item identifier list 524. The tote item identifier list 524 may comprise data indicating one or more items 104 associated with the tote 118. For example, the tote item identifier list 524 may indicate the items 104 which are present in the tote 118. The tote item tracking module 516 may generate or otherwise maintain a tote item identifier list 524.

A unique identifier 526 may also be stored in the memory 510. In some implementations, the unique identifier 526 may be stored in rewritable memory, write-once-read-only memory, and so forth. For example, the unique identifier 526 may be burned into a one-time programmable non-volatile memory, such as a programmable read-only memory (PROM). In some implementations, the unique identifier 526 may be part of a communication interface 508. For example, the unique identifier 526 may comprise a media access control (MAC) address associated with a Bluetooth interface.

The data store 522 may also store sensor data 324. The sensor data 324 may be acquired from the sensors 120 onboard the tote 118. The user interface data 124 received by the tote 118 may also be stored in the data store 522.

Other data 528 may also be stored within the data store 522. For example, tote configuration settings, user interface preferences, and so forth may also be stored.

The tote 118 may also include a power supply 530. The power supply 530 is configured to provide electrical power suitable for operating the components in the tote 118. The power supply 530 may comprise one or more of photovoltaic cells, batteries, wireless power receivers, fuel cells, capacitors, and so forth.

Figure 6:
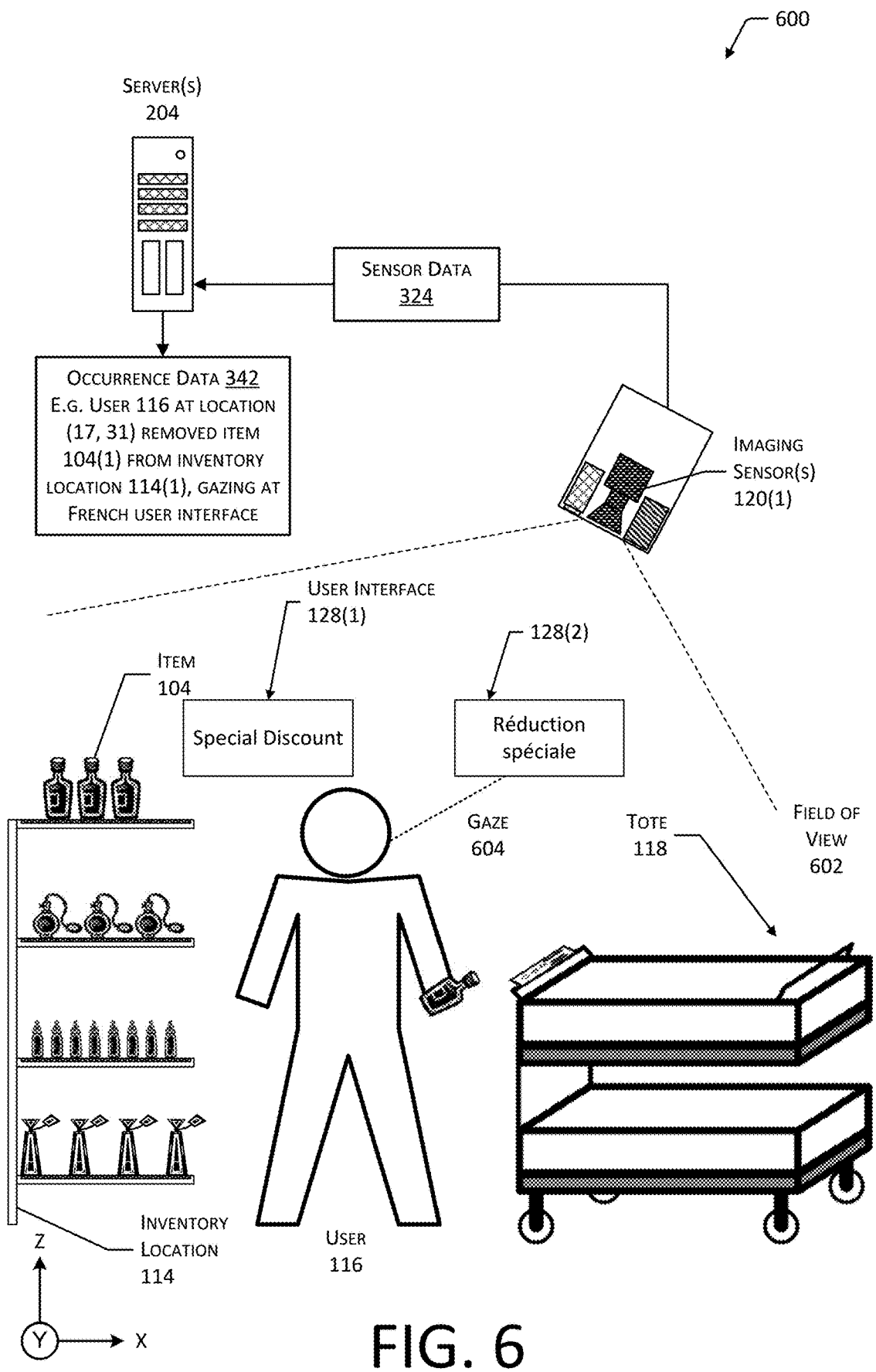
FIG. 6 illustrates an overhead imaging sensor configured to acquire sensor data in the facility, according to some implementations.

FIG. 6 illustrates a side view 600 of an overhead imaging sensor 120(1) acquiring an image of the user 116, the tote 118, and other objects. In some implementations, the facility 102 may include one or more sensors 120 that are configured to acquire an image from an overhead vantage point. The sensors 120 may include, but are not limited to, one or more imaging sensors 120(1) or 3D sensors 120(2). The sensors 120 have a field of view 602.

In this illustration, one of the sensors 120 comprises an imaging sensor 120(1) which is configured to generate the image data 326. The field of view 602 depicted here includes an inventory location 114, one or more items 104, the user 116, and the tote 118. The sensor data 324, including the image data 326, may be provided to the inventory management system 122.

For example, the inventory management module 316 executing on the server 204 may process the sensor data 324 to generate occurrence data 342. For example, based on the sensor data 324, the profile module 334 may determine occurrence data 342 indicating that the user 116 is at a particular location, has removed a first item 104(1) from the inventory location 114(1), and has their gaze 604 directed at user interface 128(2) that is presenting information in French. As described above, the occurrence data 342 may be used by the profile module 334 to generate or modify the profile data 340. For example, the occurrence data 342 indicative of the gaze 604 directed at the French user interface 128(2) may be used to modify the transient profile data 416 associated with the identity data 402 of the user 116 to specify language data 422 of French.

In some implementations, the identification module 332 may use the occurrence data 342 to determine the identity of the user 116, authenticate the identity, or both. For example, occurrence data 342 indicative of the gaze 604 as directed at the French user interface 128(2) may be used, at least in part, to differentiate the user 116(1) who reads French from the user 116(2) who does not, providing information indicative of identity.

Figure 7:
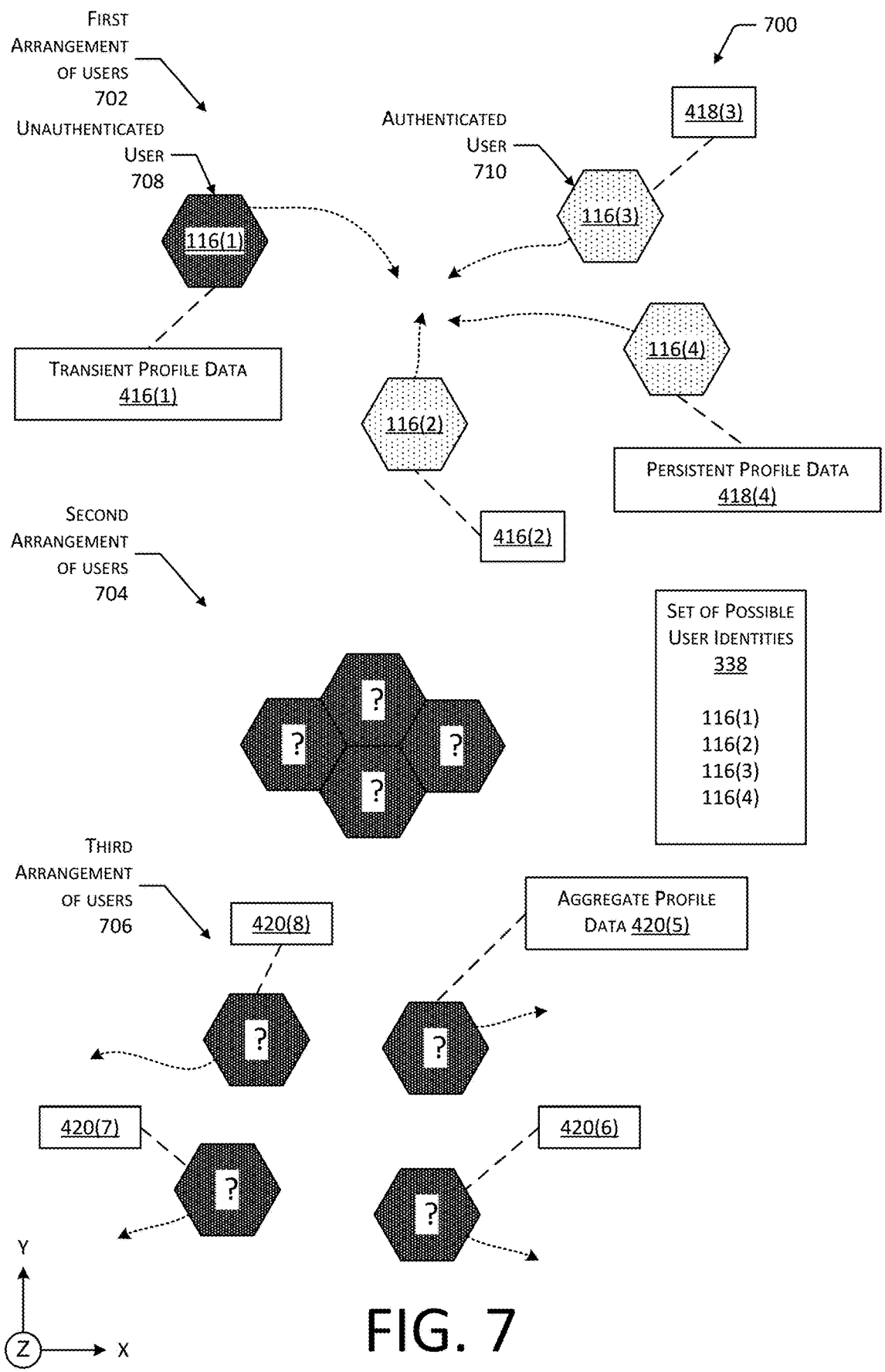
FIG. 7 illustrates an overhead view depicting movements of a plurality of the users and the use of aggregate profile data, according to some implementations.

FIG. 7 illustrates an overhead view 700 depicting movements of a plurality of the users 116 and the use of aggregate profile data 420, according to some implementations.

In this figure a first arrangement 702, second arrangement 704, and third arrangement of users 706 are depicted in an overhead view. The users 116(1)-(4) are depicted as hexagons in this and the subsequent figures. Unauthenticated users 708, such as those associated with temporary identity data 402, are indicated by a hexagon having a dark fill. Authenticated users 710, such as those associated with persistent identity data 402, are indicated by a hexagon with a light fill.

As illustrated in the first arrangement of users 702, the user 116(1) is an unauthenticated user 708 that is associated with transient profile data 416(1). For example, the user 116(1) may have entered the facility 102 without being authenticated, or the identification confidence metric 336 associated with the user 116(1) may be below a threshold value resulting in de-authentication of the user 116(1). The user 116(2) is an authenticated user 710 that is associated with transient profile data 416(2). For example, the user 116(2) may be recently authenticated and does not yet have persistent profile data 418 created. The users 116(3)-(4) are also authenticated users 710 and have associated persistent profile data 418(3)-(4), respectively. In the first arrangement of users 702, the users 116(1)-(4) are indicated as moving towards a common location in the facility 102.

As depicted by the second arrangement of users 704, the users 116(1)-(4) are in close proximity to one another. In some situations, the tracking module 330 may be unable to distinguish one user 116 from another when the two are in close proximity. For example, the tracking module 330 may lose track of one user 116 in the midst of a crowd. As indicated by the question marks within the hexagons, the identification module 332 may be uncertain as to the identity data 402 associated with the people in the crowd. Once the identity becomes uncertain, the users 116 may be de-authenticated.

The identification module 332 may generate the set of possible user identities 338. For example, based on information from the tracking module 330, a set of possible user identities 338 includes the identity data 402 for the users 116(1)-(4). In this illustration, the set of possible user identities 338 is determined by the relative motion of the users 116 and their convergence on a particular location within the facility 102. In another implementation, the set of possible user identities 338 may be determined based on proximity data, information as to the users 116 who are known to be within the facility 102 at a given time, and so forth.

As indicated by the third arrangement of users 706, the users 116(1)-(4) have moved apart from one another. However, the identification module 332 has not yet been able to reestablish the identity data 402 associated with each of the users 116. At this time, the identification module 332 may provide temporary identification data to each of the users 116 to differentiate one from another. The profile module 334 may be configured to generate aggregate profile data 420 based at least in part on the profile data 340 that is associated with the user identities of the user's 116(1)-(4). The aggregate profile data 420 may be based on one or more common settings across the different profile data 340. For example, a common preferred UI scheme 426 that is specified by a majority of the profile data 340 may be used in the aggregate profile data 420. In another example, accommodation data 428 such as information indicating that one of the user profiles 340 is configured for a low vision or hearing impaired user 116, may result in aggregate profile data 420 configured to provide visual and audible output.

Once the identification module 332 is able to reestablish the identity of the users 116, the user interface module 344 may resume presenting a user interface 128 to the respective users 116 based at least in part on their previously assigned profile data 340. For example, user 116(1) may be identified and may see a user interface 128(1) generated based on the transient profile data 416(1). The transient profile data 416(1) may omit the confidential data 412 until the user 116 has been re-authenticated.

The aggregate profile data 420 may be updated after one or more of the users 116 have been identified, authenticated, or both. For example, after identifying and authenticating the user 116(1), the user 116(1) may be removed from the set of possible user identifies 338. Once removed, the aggregate profile data 420 in use by the users 116 who remain unidentified or unauthenticated may be regenerated or updated using the profile data 340 of the remaining possible users 116(2)-(4).

Figure 8:
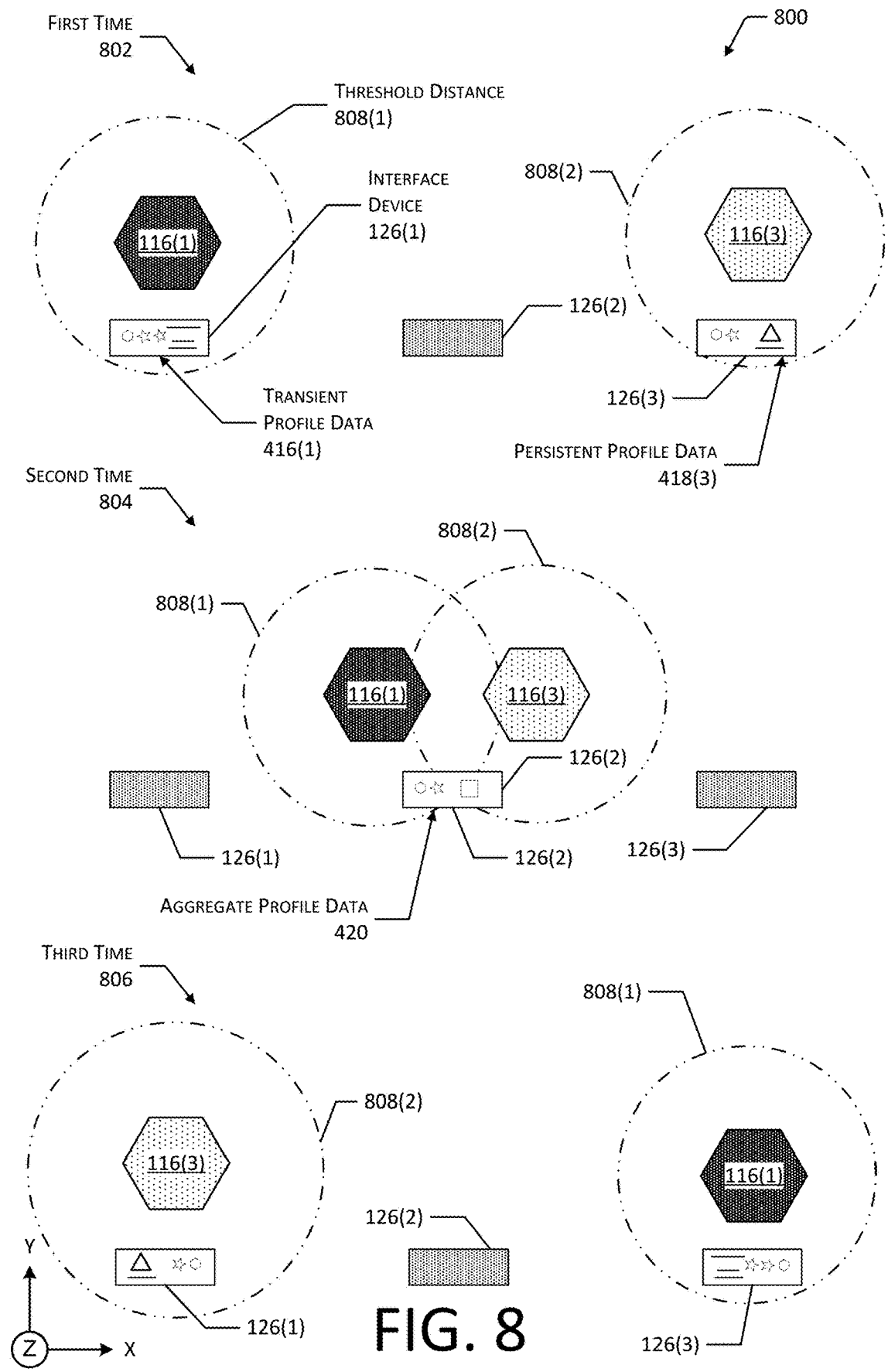
FIG. 8 illustrates an overhead view depicting movements of the users and the user interfaces presented on nearby interface devices, according to some implementations.

FIG. 8 illustrates an overhead view 800 depicting movements of a plurality of users 116 and the user interfaces 128 presented on nearby interface devices 126, according to some implementations. The figure depicts users 116(1) and 116(3) at a first time 802, a second time 804, and a third time 806. As above, the users 116(1) and (3) are depicted as hexagons, with unauthenticated users indicated by a hexagon having a dark fill and authenticated users indicated by a hexagon with a light fill. In this illustration, there are three interface devices 126(1)-(3) arranged in a line along an x-axis. At the first time 802, the user 116(1) is next to the first interface device 126(1), the second user 116(3) is next to the third interface device 126(3). The user 116(1) is within a threshold distance 808(1) of the first interface device 126(1). Based at least in part on this proximity, the user interface module 344 presents the user interface 128(1) based on the transient profile data 416(1) associated with the identity data 402(1) of the user 116(1). Similarly, the user 116(3) is within a threshold distance 808(2) of the third interface device 126(3). Based at least in part on this proximity, the user interface module 344 presents the user interface 128(3)

based on the persistent profile data 418(3) associated with the identity data 402(3) of the user 116(3). Thus, each user 116(1) and 116(3) may experience on the interface device 126 closest to them, a user interface 128 that is customized to each.

At the second time 804, the two users 116(1) and 116(3) have moved towards one another and proximate to the second interface device 126(2). Based at least in part on the proximity of both of the users 116(1) and 116(3) to the same interface device 126(2), the profile module 334 may generate aggregate profile data 420. For example, the profile module 334 may combine settings common to the transient profile data 416(1) and the persistent profile data 418(3) to generate the aggregate profile data 420. In some implementations, the least restrictive or most inclusive setting among the input profile data 340 may be used.

As a result of the aggregate profile data 420, at the second time 804 the two users 116(1) and 116(3) are presented with the user interface 128 that may be suitable for both to use simultaneously. This may improve the user experience for both of the users 116(1) and 116(3).

At the third time 806, the users 116(1) and 116(3) have moved past one another such that the user 116(3) is next to the first interface device 126(1) and the user 116(1) is next to the third interface device 126(3). Based at least in part on the respective interface devices 126 being within the respective threshold distances 808, each presents the user interface 128 based at least in part on the profile data 340 associated with the identity data 402 of each user 116.

As the user 116 moves throughout the facility 102, the user interface 128 manifests the preferences indicated by the profile data 340 may appear to "follow" the user 116. As a result, the user 116 is provided with a familiar user interface 128 that is adapted for their particular preferences or needs.

In this illustration the threshold distance 808 is expressed relative to the user 116. In other implementations, the threshold distance 808 may be expressed relative to an object such as an interface device 126, tote 118, and so forth.

Figure 9:
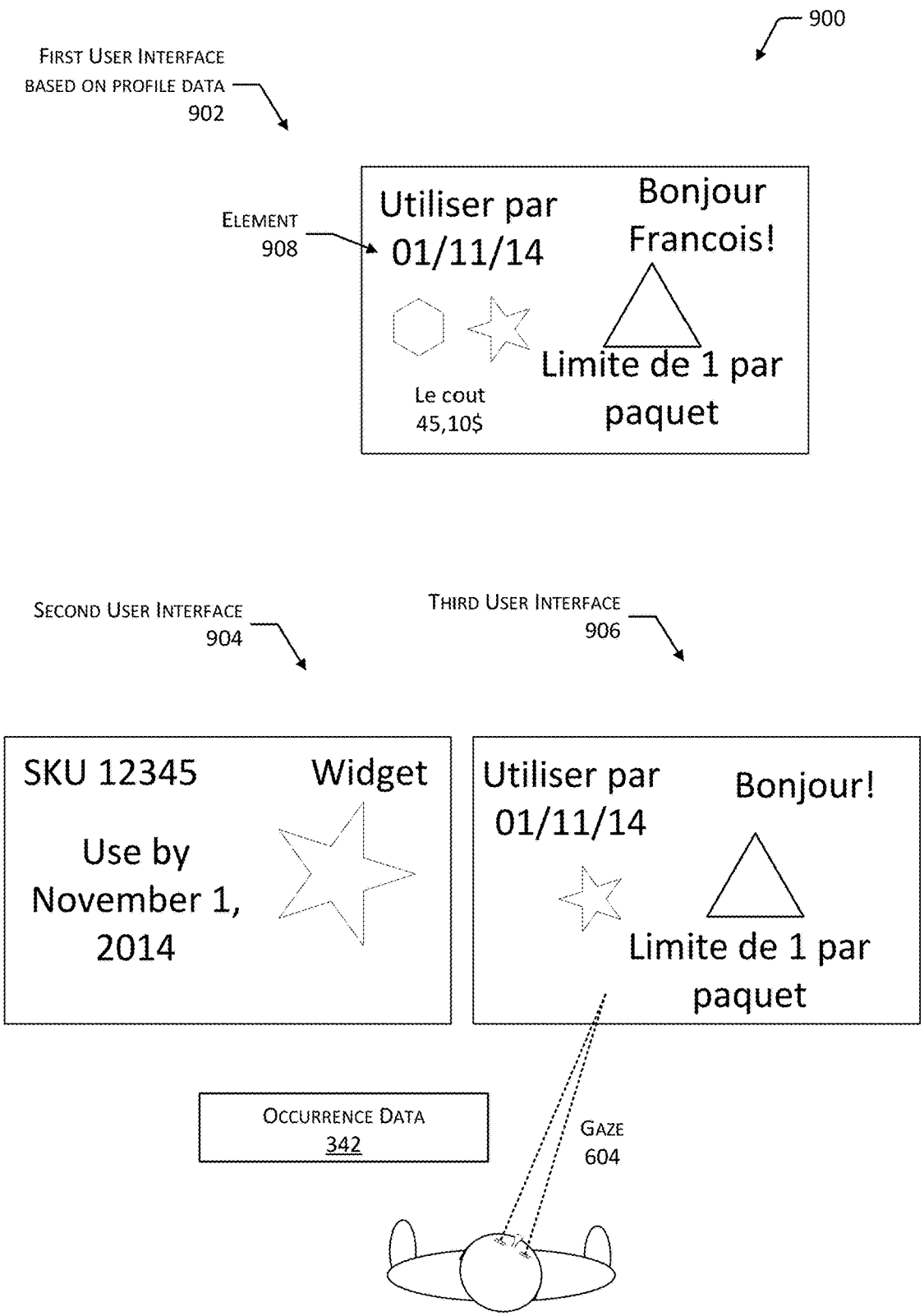
FIG. 9 depicts examples of the user interface used to generate occurrence data, according to some implementations.

FIG. 9 depicts examples 900 of the user interfaces 128 that may be used to generate occurrence data 342. The occurrence data 342 that may be used to generate profile data 340, determine the identity data 402 of the user 116, and so forth, according to some implementations.

The user interface module 344 may present a first user interface 902, a second user interface 904, or third interface 906 as depicted here. The user interfaces 128 depicted in this figure may include one or more elements 908. The elements 908 may include one or more visual elements, audible elements, or haptic elements. For example, the first user interface 902 comprises a plurality of visual elements including text and graphics.

The first user interface 902 may be based on profile data 340. For example, the first user interface 902 may be generated using persistent profile data 418 associated with the identity data 402 of a particular user 116. In the example depicted here, the persistent profile data 418 specifies language data 422 indicating French, as well as a French numbering convention for the presentation of dates and numeric values (e.g. "Day/Month/Year" and use of a comma separator instead of a decimal for currency values). Furthermore, confidential data 412 associated with the user 116 such as cost data is also presented in the first user interface 902.

The user's 116 interaction with the second user interface 904, the third user interface 906, or both may be used to generate occurrence data 342. The occurrence data 342 may then be used for a variety of purposes. In one implementation, the profile module 334 may use the following techniques to test different versions of user interfaces 128, to refine the information in the profile data 340, and so forth. For example, different user interfaces 128 may be presented to the user 116 to facilitate "A/B" testing of different user interfaces 128.

As depicted here, the second user interface 904 may present information using the English language and American date conventions. In this example, the identity of the user 116 may be uncertain, so the confidential data 412 is omitted from the second user interface 904. In comparison, the third user interface 904 presents information using the French language and French numbering date conventions.

The occurrence data 342 may be acquired, such as the gaze 604 of the user 116 being directed to the third user interface 906, or the user 116 otherwise interacting with the third user interface 906 by activating one or more controls associated therewith. Based at least in part on the occurrence data 342, the profile module 334 may confirm the language data 422 as French.

In another implementation, the identification module 332 may use the different user interfaces 904 and 906 to attempt to determine the identity of the user 116. For example, as described above with regard to FIG. 7, in some implementations the identification module 332 may determine that the identification confidence metric 336 for a particular user 116 has dropped below a threshold value. Subsequently, the identification module 332 may operate to determine the identity of the user 116. By using the occurrence data 342 resulting from presentation of the second user interface 904 and the third user interface 906, the identification module 332 may be able to determine the identity of the user 116. For example, the set of possible user identities 338 may include only a single user 116 has language data 422 indicating a preference for French. Based on the occurrence data 342 indicating that this user 116 is interacting with the third user interface 906 as expressed in French, the identification module 332 may be able to determine the identity of the user 116.

Illustrative Processes

Figure 10:
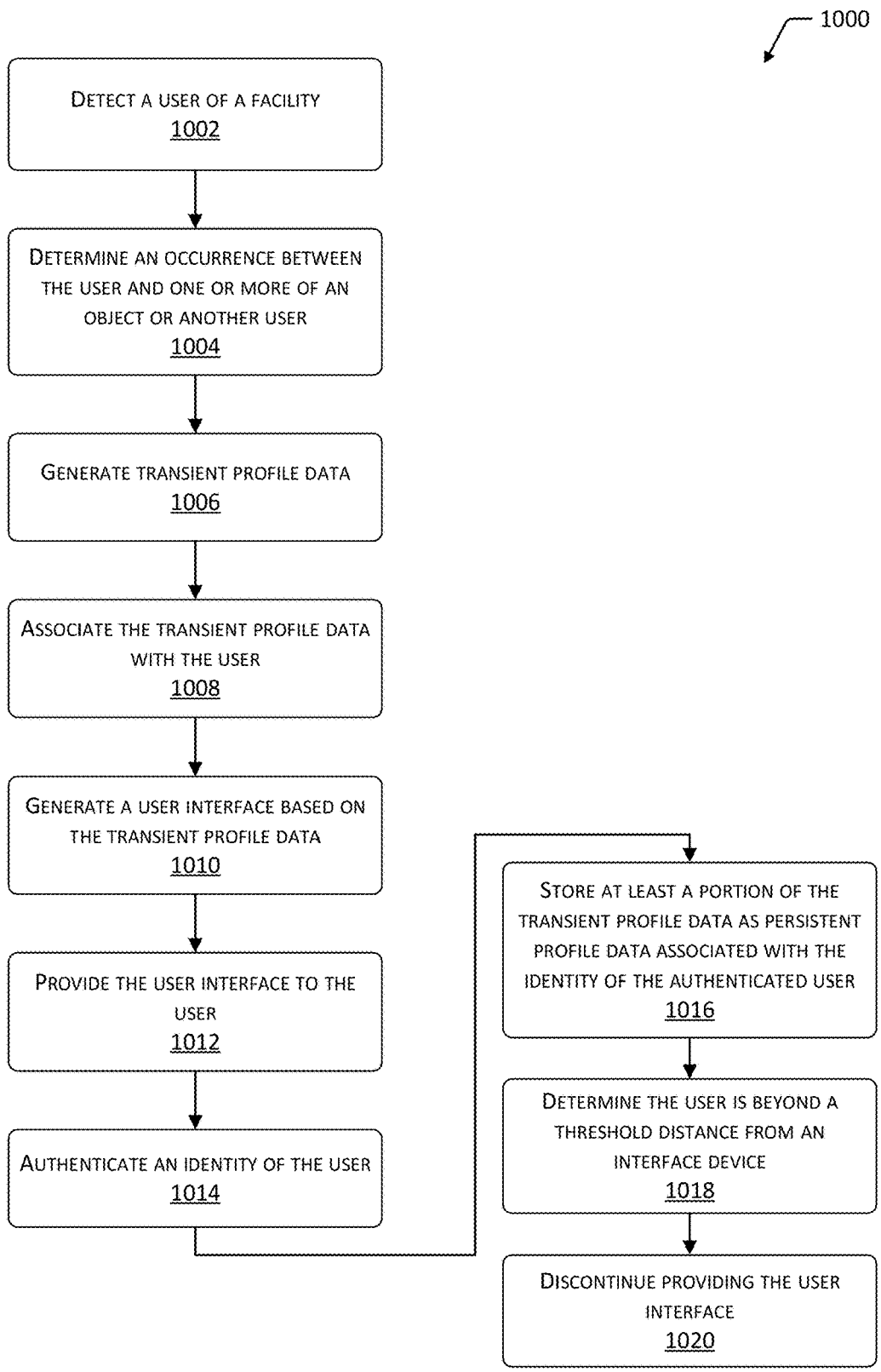
FIG. 10 depicts a flow diagram of a process for generating and using transient profile data associated with an unauthenticated user, according to some implementations.

FIG. 10 depicts a flow diagram 1000 of a process for generating and using transient profiles associated with an unauthenticated user, according to some implementations.

Block 1002 detects, using the sensor data 324, a user 116 of the facility 102. For example, an image of the user 116 may be acquired by one or more of the imaging sensors 120(1). Detection indicates a physical presence of the user 116 at the facility 102. The user 116 may be unauthenticated. For example, the user 116 may be recognized as a human and have a temporary identity associated therewith to distinguish one user 116 from another. The unauthenticated user 116 is thus not associated with a persistent user identity, such as a previously established user account or specific identification such as the real name of the user 116. In comparison, an authenticated user 116 may be associated with a persistent user identity.

Block 1004 determines an occurrence involving the user 116. For example, the inventory management module 316 may generate occurrence data 342. The occurrence data 342 may be indicative of one or more of: speaking, reading, interacting with an item 104 or an inventory location 114, placing or removing the item 104 within a tote 118, interacting with another person, interacting with the user interface 128, and so forth. For example, the interaction may comprise the user 116 looking at one or more of the inventory location 114 or the item 104. In another example, the interaction with the user interface 128 may comprise the user 116 accessing or entering information with the user interface 128.

Block 1006 generates transient profile data 416. As described above, the transient profile data 416 may comprise information indicative of one or more of: user interface preference of the user 116, language spoken by the user 116, or item preference of the user 116. For example, transient profile data 416 may include the language data 422, the preferred UI mode 424, the preferred UI scheme 426, the accommodation data 428, and so forth.

Block 1008 associates the transient profile data 416 with the user 116. For example, the transient profile data 416 may be associated with the temporary identity data or the persistent identity data of the user 116.

Block 1010 generates a user interface 128 based on the transient profile data 416. For example, the user interface module 344 may generate user interface data 124 configured to produce the user interface 128 upon presentation by an interface device 126.

Block 1012 provides to the user 116, with at least one of the interface devices 126, the user interface 128. For example, the interface device 126 may present the user interface 128.

Block 1014 authenticates an identity of the user 116. For example, the identification module 332 may compare the identity data 402 associated with the user 116 with the sensor data 324. The identity data 402 may be determined using one or more techniques, including but not limited to facial recognition, voice recognition, data obtained from one or more devices in possession of the user 116, input received from the user 116, and so forth. Other techniques may include one or more of: clothing recognition, gait recognition, iris recognition, vascular pattern recognition, hand recognition, ear recognition, fingerprint recognition, or other techniques.

Facial recognition may include analyzing facial characteristics which are indicative of one or more facial features in an image, three-dimensional data, or both. For example, the face of the user 116 may be detected within one or more of the images of the image data 326. The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors as descriptive of a human face may be known as "eigenfaces" or "eigenimages". In one implementation, the facial recognition described in this disclosure may be performed, at least in part, using one or more tools available in the OpenCV library as developed by Intel Corporation of Santa Clara, California, Willow Garage of Menlo Park, California, and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity. The eigenvectors or other measurements may be compared with previously stored characteristics to determine the identity data 402 of the person in the image, or to distinguish one user 116 from another.

Clothing recognition analyzes images to determine what articles of clothing, ornamentation, and so forth the user 116 is wearing or carrying. Skin and hair detection algorithms may be used to classify portions of the image which are associated with the user's 116 skin or hair. Items which are not skin or hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. For example, the user 116(2) may be distinguished from the user 116(3) based at least in part on the user 116(2) wearing a hat and a red shirt while the user 116(3) is not wearing a hat and is wearing a blue shirt. The clothing may be used to identify the user 116, or distinguish one user 116 from another.

Gait recognition techniques analyze one or more of images, three-dimensional data, or other data, to assess how a user 116 moves over time. Gait comprises a recognizable pattern of movement of the user's 116 body which is affected by height, age, and other factors. Gait recognition may analyze the relative position and motion of limbs of the user 116. Limbs may include one or more arms, legs, and in some implementations, the head. In one implementation edge detection techniques may be used to extract a position of one or more limbs of the user 116 in the series of images. For example, a main leg angle of a user's 116 leg may be determined, and based on the measurement of this main leg angle overtime and from different points-of-view, a three-dimensional model of the leg motion may be generated. The change in position over time of the limbs may be determined and compared with previously stored information to determine an identity of the user 116, or distinguish one user 116 from another.

In some implementations, identity may be based on a combination of these or other recognition techniques. For example, the user 116 may be authenticated based on clothing recognition, gait recognition, and facial recognition. The different recognition techniques may be used in different situations, or in succession. For example, clothing recognition and gait recognition may be used at greater distances between the user 116 and the imaging sensors 120(1) or when the user's 116 face is obscured from view by the imaging sensor 120(1). In comparison, as the user 116 approaches the imaging sensor 120(1) and their face is visible, facial recognition may be used. Once authenticated, such as by way of facial recognition, one or more of gait recognition or clothing recognition may be used to track the user 116 within the facility 102.

In other implementations, other techniques for facial recognition, clothing recognition, gait recognition, and so forth may be employed. For example, facial recognition may use iris detection and recognition, clothing recognition may use embedded tags 206, gait recognition may utilize data from weight sensors 120(6), and so forth.

As described above, in some implementations the transient profile data 416 may be discarded. A first block (not depicted) may determine the user 116 has left the facility 102. For example, the sensor data 324 may indicate that an RFID tag 206 associated with the user 116 has passed through an exit. A second block (not depicted) may then discard the transient profile data 416. In implementations where the transient profile data 416 is associated with temporary identity data 402, the temporary identity data 402 may also be discarded. In another implementation, the transient profile data 416 may be retained but anonymized. For example, the transient profile data 416 may be analyzed using one or more statistical techniques to determine initial settings for subsequently generated transient profile data 416.

Block 1016 stores at least a portion of the transient profile data 416 as persistent profile data 418 associated with the identity of the user 116. For example, the transient profile data 416 may be merged into or converted to persistent profile data 418 having profile ID data 404 and is stored as the profile ID data 404 in the user data 328 associated with the identity data 402.

Block 1018 determines the user 116 is beyond a threshold distance 808 from a first interface device 126. For example, the user 116 may have walked away from the interface device 126(1).

Block 1020 discontinues providing the user interface 128 with the first interface device 126. As described above with regard to FIG. 8, as the user 116 is within the threshold distance 808 of another interface device 126, that interface device 106 may present the user interface 128.

Figure 11:
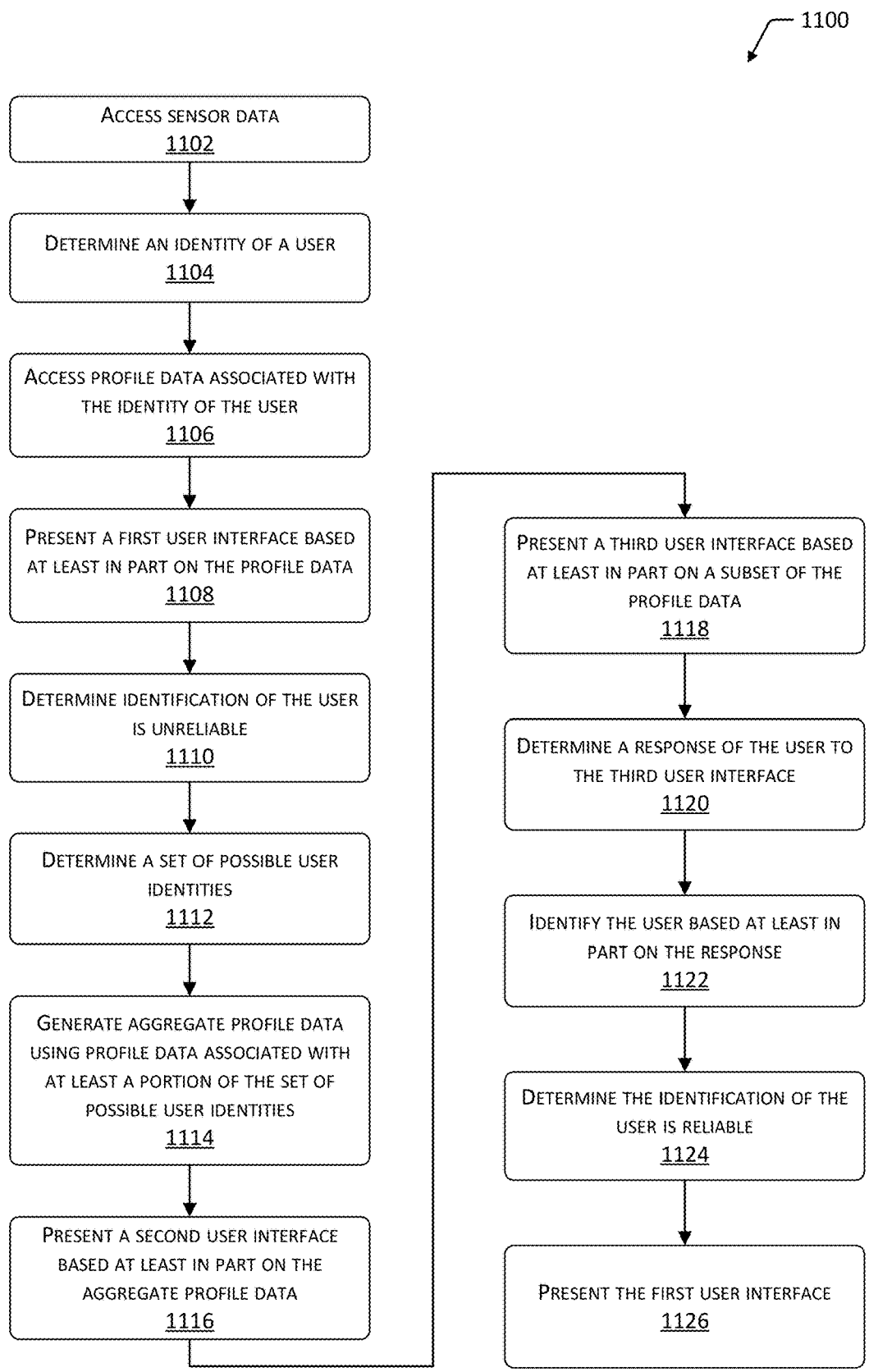
FIG. 11 depicts a flow diagram of a process for presenting a user interface based on aggregate profile data, according to some implementations.

FIG. 11 depicts a flow diagram 1100 of a process for presenting a user interface 128 based on aggregate profile data 420, according to some implementations.

Block 1102 accesses sensor data 324 acquired by one or more sensors 120 at the facility 102. For example, the sensor data 324 may include image data 326 acquired from one or more imaging devices 120(1). The sensor data 324 may also include, but is not limited to, image data 326, location data 408 indicative of a location of the user 116 within the facility 102, one or more items 104 within a tote 118 in use by the user 116, item data 322 indicative of one or more items 104 proximate to the user 116, a time of entry of the user 116 into the facility 102, and so forth.

Block 1104 determines an identity of a user 116 in the facility 102 using the sensor data 324. For example, the image data 326 may be used to determine the user 116 is new to the facility 102 and a temporary identity may be assigned to the user 116. In another example, the identity may be determined based at least in part on the item data indicative of the one or more items 104 within a tote 118 in use by the user 116. Continuing the example, the tote item identifier list 524 may provide a list of items 104 that may be compared with picking information previously acquired about the user 116 who is associated with a persistent user identity.

In some implementations, the identity of the user 116 may be authenticated. For example, the sensor data 324 may include fingerprint data acquired from the user 116. Based at least in part on a comparison of the fingerprint data with previously stored information such as in the persistent identity data 402, the persistent identity data 402 associated with the user 116 may be determined.

Block 1106 accesses profile data 340 associated with the identity of the user 116. For example, the persistent profile data 418 associated with the identity data 402 of the authenticated user 116 may be retrieved from the data store 318. In yet another example, the transient profile data 416 associated with the identity data 402 of the unauthenticated user 116 with a temporary identity may be retrieved from the data store 318.

Block 1108 presents a first user interface 128(1) based at least in part on the profile data 340. For example, the user interface module 344 may generate user interface data 124(1) based at least in part on the persistent profile data 418. The user interface data 124(1) may be provided to an interface device 126 that, in turn, presents the user interface 128.

Block 1110 determines the identity of the user 116 is unreliable. For example, the identification module 332 may determine an identification confidence metric 336 of the determined identity of the user 116 is less than a threshold level. The identity of the user 116 may become unreliable due to a change in appearance of the user 116, failure of one or more sensors 120, passage of the user 116 through a portion of the facility 102 lacking sensor 120 coverage, a plurality of users 116 moving into close proximity to one another, and so forth. For example, after the user 116 has entered a crowd of other users 116, the identification module 332 may generate an identification confidence metric 336 for that user 116 that is below the threshold level. As a result, the authentication previously associated with the identity of the user 116 may no longer be valid, resulting in the user 116 now being deemed unauthenticated.

Block 1112 determines a set of possible user identities 338 using the sensor data 324. As described above, the identities may be persistent or temporary. In one implementation, the set of possible user identities 338 may comprise identities associated with a plurality of users 116 who have moved proximate to one another. This determination may be facilitated by the location data 408 that is generated by the tracking module 330, the time of entry of the user 116 into the facility 102, and so forth. For example, the set of possible user identities 338 may be determined based on a list of users 116 that have entered the facility 102 since a predetermined time, such as an opening time.

In another implementation, the set of possible user identities 338 may be determined by tracking locations of a plurality of users 116 within the facility 102. Using the tracked locations, the inventory management module 316 may determine the identities of the plurality of users 116 within a threshold distance of the user 116 prior to a time associated with acquisition of the sensor data 324 used to determine that the identification confidence metric 336 is less than the threshold level. For example, the tracking module 330 and the identification module 332 may provide the identities of the plurality of users 116 at time "t" before confidence in the identity of the particular user 116 was lost. In another example, the set of possible user identities 338 may include the user identities of the users 116 within a threshold distance of the user 116 at time "t", prior to the identification confidence metric 336 dropping below a threshold level.

Block 1114 generates aggregate profile data 420 using profile data 340 associated with at least a portion of the set of possible user identities 338. For example, the profile module 334 may generate the aggregate profile data 420 based at least in part on common settings between the profile data 340 of the users 116 indicated by the set of possible user identities 338.

In one implementation, the generating the aggregate profile data 420 may comprise accessing the profile data 340 for at least a subset of the set of possible user identities 338. The profile data 340 is indicative of one or more categories and one or more values associated with each category. For example, the categories may comprise the language data 422, the preferred UI mode 424, the preferred UI scheme 426, the accommodation data 428, and so forth. Continuing the example, the values may indicate the particular language, mode, scheme, or accommodation, respectively.

In one implementation, the value of the category may be determined as the value occurring in a majority of the subset of the set of possible user identities 338. In another implementation, the value may be based on one or more statistical operations including, but not limited to a minimum, maximum, mean, median, and so forth. In yet another implementation, the value may be selected based on a previously specified hierarchy indicative of a level of restriction or inclusiveness. For example, where the category indicates the preferred UI mode 424, and accommodation 428 from the input profile data 340 indicates that one user 116 is visually impaired, a more inclusive selection may include audible and visual output. In comparison, a less inclusive selection may comprise a preferred UI mode 424 that is visual only.

As described above, the profile data 340 may include accommodation data 428. In one implementation, the generation of the aggregate profile data 420 may comprise a combination of one or more accommodations indicated by the accommodation data 428. For example, the accommodation data 428 from first profile data 340(1) may indicate the user 116(1) uses a wheelchair, the second profile data 340(2) may indicate the user 116(2) is deaf, and the third profile data 340(3) may indicate the user 116(3) is visually impaired. The resulting aggregate profile data 420 may comprise a concatenation of these accommodations, such that the aggregate profile data 420 includes the accommodations of wheelchair, deaf, and visually impaired. As a result, the aggregate profile data 420 provides a user experience that is accessible to all of the users 116 in the set of possible user identities 338.

Block 1116 presents a second user interface 128(2) based at least in part on the aggregate profile data 420. For example, the user interface module 344 may generate user interface data 124(2) based at least in part on the aggregate profile data 420. The user interface data 124(2) may be provided to an interface device 126 that, in turn, presents the user interface 128(2).

Block 1118 presents a third user interface 128(3) based at least in part on a subset of the profile data 340 associated with the identity of the user 116. For example, the profile data 340 may comprise transient profile data 416 or persistent profile data 418. In some implementations, the subset may omit the confidential data 412. For example, the third user interface 128(3) may be generated without the elements 908 that present confidential data 412.

Block 1120 determines a response of the user 116 to the third user interface 128(3). In some implementations, the response may be indicated at least in part by the occurrence data 342. For example, the response may be indicated by occurrence data 342 indicative of the gaze 604 of the user 116 at the third user interface 128(3), or otherwise interacting with the third user interface 128(3).

Block 1122 identifies the user 116 based at least in part on the response. For example, based on the occurrence data 342 indicating that the user interacted with the third user interface 128(3), and given that the third user interface 128(3) was generated using information from profile data 340 particular to the user 116, the identity data 402 of the user 116 may be determined.

Block 1124 determines the identification of the user 116 is reliable. In one implementation, the identification may be deemed reliable when the identification confidence metric 336 is greater than or equal to the threshold level. For example, based on the identification in the occurrence data 342, the identification module 332 may assess the identification confidence metric 336 as having increased. The identification may be deemed unreliable when the identification confidence metric is less than the threshold level.

Block 1126 presents the first user interface 128(1). Continuing the example above, now that the identity data 402 of the user 116 has been reasserted, the profile data 340 associated with the identity data 402 may be used to provide the user interface 128 for the user 116.

Figure 12:
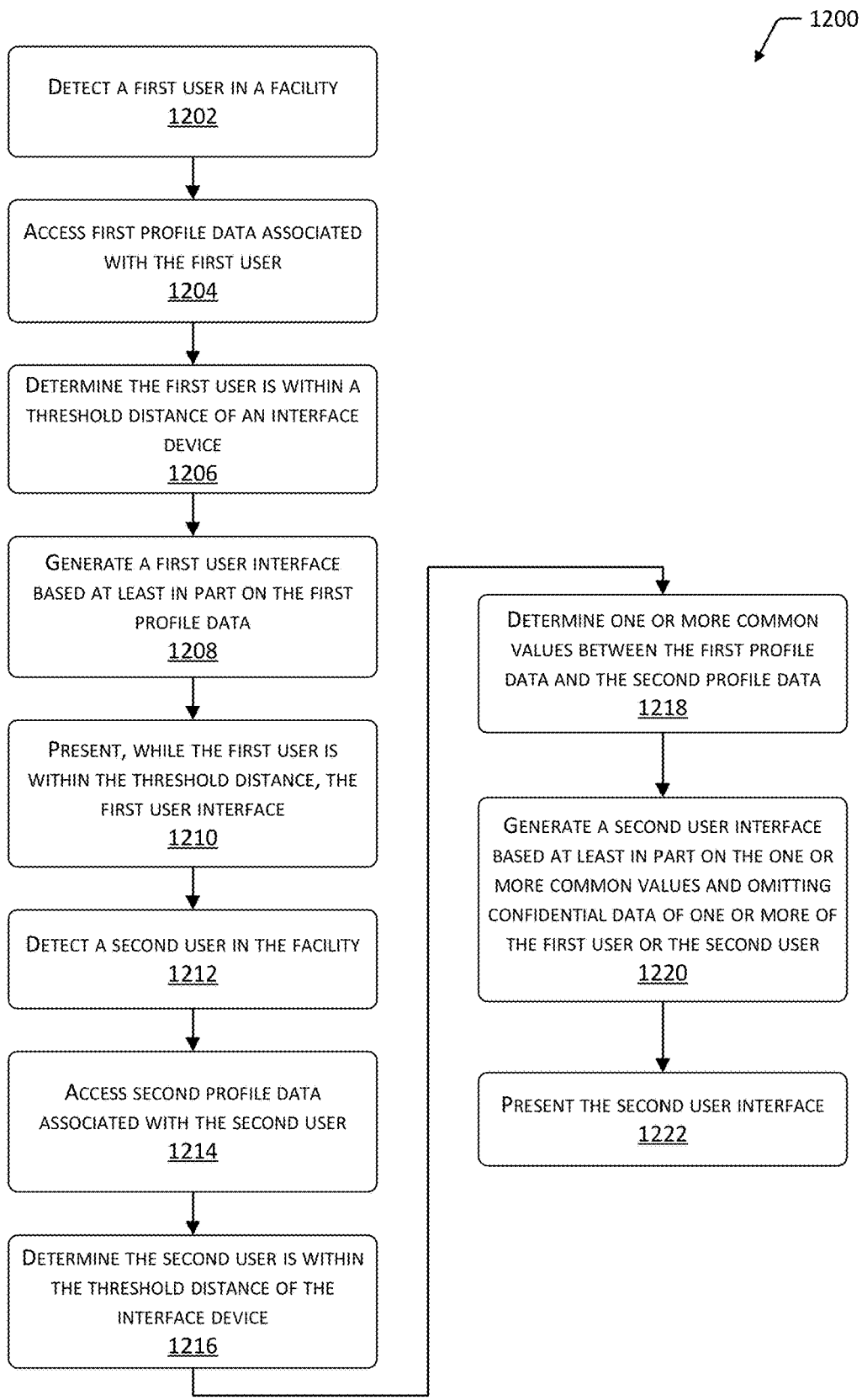
FIG. 12 depicts a flow diagram of a process for presenting a user interface based on a distance from the user, according to some implementations.

FIG. 12 depicts a flow diagram 1200 of a process for presenting a user interface 128 based on a distance from the user 116 to an object or another user 116, according to some implementations.

Block 1202 detects a first user 116(1) in the facility 102. For example, the imaging sensor 120(1) may acquire image data 326 comprising an image that includes the first user 116(1) entering the facility 102.

Identity data 402 for the user 116 may be determined. The identity data 402 may be temporary or persistent. For example, the image data 326 may be processed using the facial recognition techniques described above to determine the temporary identity data 402 or the persistent identity data 402 associated with the face. As described, an unrecognized or otherwise unidentified user 116 may be issued temporary identity data 402.

The identity of the user 116 of the facility 102 may be authenticated or unauthenticated. As described above, authentication provides an assurance or verification as to the identity of the user 116.

Block 1204 accesses first profile data 340(1) associated with the user 116. In some implementations, access may comprise retrieving the first profile data 340(1) associated with the identity data 402 of the user 116(1). In some implementations, the first profile data 340(1) may be transient profile data 416 or persistent profile data 418.

The first profile data 340(1) may comprise information indicative of one or more preferences of the user 116(1). In some implementations, the profile data 340 may comprise accommodation data 428 indicative of one or more accommodations associated with the user 116. The accommodation data 428 provides information indicative of the accommodations used by the user 116 while in the facility 116. For example, the accommodation data 428 may be indicative of the use of assistive devices or techniques.

The accommodation data 428 may be generated using information acquired from the sensors 120. For example, the inventory management module 316 may process the image data 326 of the user 116 to determine that the user 116 is using a wheelchair, using crutches, is walking with a cane, has a cast on their leg, and so forth. In this example, the accommodation data 428 generated may indicate that the user 116 has limited mobility. In another example, the inventory management module 316 may use sensor data 324 such as audio data acquired by the one or more microphones 120(5) to detect the user 116 saying phrases indicative of hearing difficulties, such as "say that again?" or "what?". In this example, the accommodation data 428 generated may indicate a hearing loss.

As described above, in some implementations the inventory management system 316 may be configured to generate occurrence data 342 indicative of one or more occurrences involving the user 116 and one or more of an object or another user 116 within the facility 102. For example, the occurrence data 342 may indicate an occurrence that the user 116 speaking in French. As described above, in some implementations the profile data 340 may be generated using the one or more occurrences as represented by the occurrence data 342. For example, the transient profile data 416 may have the language data 422 indicating a language preference set to French based on the occurrence of the user 116 speaking French.

Block 1206 determines the first user 116 is within a threshold distance 808 of an interface device 126. For example, the location data 408 associated with the user 116 may be compared to the physical layout data 320 comprising information indicative of the location of the interface device 126.

Block 1208 generates a first user interface 128(1) based at least in part on the first profile data 340(1).

Block 1210 presents, while the user 116 is within the threshold distance 808 of the interface device 126, the first user interface 128(1). Should the user 116 move away and the distance between the user 116 and the interface device 126 is greater than the threshold distance 808, a second user interface 128(2) based on profile data 340 unassociated with the user 116 may be presented. For example, the second user interface 128(2) may be based on aggregate profile data 420.

In some implementations, presentation of the first user interface 128(1) may be discontinued upon determination that the identification confidence metric 336 associated with the user 116 is less than a threshold level. For example, the identification confidence metric 336 may drop below the threshold level when the user 116 is obscured from view by one or more of the imaging sensors 120(1), has moved into a crowd of other users 116, and so forth. In place of, or in addition to, the first user interface 128(1), a second user interface 128(2) may be presented. The second user interface 128(2) may be based at least in part on second profile data 340(2). For example, the second profile data 340 may comprise aggregate profile data 420 generated from at least a portion of the profile data 340 associated with the user identities indicated in a set of possible user identities 338.

Block 1212 detects a second user 116(2) in the facility 102. Similar to that described above, an identity of the second user 116(2) may be determined. The second user 116(2) may be associated with a temporary identity or a persistent identity. In some implementations the identity may be authenticated, providing an association between the second user 116(2) and persistent identity data 402.

Block 1214 accesses second profile data 340(2) associated with the second user 116. For example, the persistent profile data 418 associated with the persistent identity data 402 of the second user 116(2) may be retrieved. In another example, the transient profile data 416 associated with the persistent identity data 402 or the temporary identity data 402 of the second user 116(2) may be retrieved.

Block 1216 determines the second user 116(2) is within the threshold distance 808 of the interface device 126.

Block 1218 determines one or more common values between the first profile data 340(1) and the second profile data 340(2). For example, the common values may comprise values that are the same, within a threshold range of one another, and so forth.

Block 1220 generates a second user interface 128(2) based at least in part on the one or more common values. In some implementations, the second user interface 128(2) may be configured to omit presentation of confidential data 412 of one or more of the first user 116(1) or the second user 116(2).

Block 1222 presents the second user interface 128(2) instead of the first user interface 128(1).

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a memory storing computer-executable instructions; and
a hardware processor configured to execute the computer-executable instructions to:
   authenticate a first user;
   assign persistent profile data to the first user;
   determine a group of users in a facility at a first time, wherein the group of users comprises:
      the first user that has been authenticated, and
      a second user that has not been authenticated;
   determine the users in the group are within a threshold distance of each other at a second time;
   responsive to the users in the group being within the threshold distance of each other at the second time, designate all users in the group as unauthenticated users;
   assign aggregate profile data to the unauthenticated users, responsive to the users in the group being designated as unauthenticated users;
   acquire one or more images using one or more sensors;
   determine, using the one or more images, one or more characteristics of the first user;
   establish an identity of the first user at a third time based on the one or more characteristics of the first user;
   authenticate the first user;
   update the aggregate profile data by removing, from the aggregate profile data, profile data associated with the first user that has been authenticated;
   determine that the first user has interacted with an item at an inventory location; and
   update the persistent profile data assigned to the first user to include information associated with the item.

2. The system of claim 1, the hardware processor further configured to execute the computer-executable instructions to:
   determine a set of possible user identities associated with the unauthenticated users, responsive to the users in the group being within the threshold distance of each other at the second time, wherein the set of possible user identities is based on one or more of:
      relative motion of the users in the group between the first time and the second time,
      convergence of the users in the group on a particular location within the facility,
      proximity data, or
      information associated with users known to be in the facility at a given time; and
   determine profile data for the unauthenticated users based on the set of possible user identities;
   wherein the aggregate profile data is determined by aggregating at least a portion of the profile data for the unauthenticated users.

3. The system of claim 1, wherein the second user in the group is an unauthenticated user at the first time as a result of:
   the second user entering the facility without being authenticated, or
   an identification confidence metric associated with the second user at the first time being below a threshold value.

4. The system of claim 1, the hardware processor further configured to execute the computer-executable instructions to:
   determine temporary identification data for each of the unauthenticated users, responsive to the users in the group being designated as unauthenticated users.

5. The system of claim 1, the hardware processor further configured to execute the computer-executable instructions to:
   determine profile data for the unauthenticated users based on a set of possible user identities, wherein the aggregate profile data is based on common settings specified by a majority of the profile data.

6. The system of claim 1, further comprising:
   a display device configured to present a user interface; and
   the hardware processor further configured to execute the computer-executable instructions to:
      determine the first user is within a second threshold distance of the display device at the first time;
      present a first user interface on the display device based on the persistent profile data;
      determine the first user is within the second threshold distance of the display device after the second time but before the third time;
      present a second user interface on the display device based on the aggregate profile data;
      determine the first user is within the second threshold distance of the display device after the third time; and
      present a third user interface on the display device based on the persistent profile data that has been updated.

7. The system of claim 1, further comprising:
   a display device; and
   the hardware processor further configured to execute the computer-executable instructions to:
      determine one or more of the unauthenticated users is within a second threshold distance of the display device after the second time but before the third time; and
      present a user interface on the display device based on the aggregate profile data.

8. The system of claim 1, wherein the aggregate profile data is based on one or more of:
   transient profile data associated with one or more unauthenticated users in the group at the first time,
   persistent profile data associated with one or more authenticated users in the group at the first time, or
   other aggregate profile data associated with one or more of the users in the group.

9. The system of claim 1, wherein profile data for a user comprises information indicative of one or more of:
   identification data,
   language data,
   preferences associated with a user interface (UI) mode,
   preferences associated with a UI scheme, or
   accommodation data.

10. A method comprising:
   authenticating a first user;
   assigning persistent profile data to the first user;
   determining, at a first time, a first arrangement of users, wherein the first arrangement of users comprises the first user that has been authenticated and at least one unauthenticated user;
   determining, at a second time, a second arrangement of users, wherein the users in the second arrangement of users are within a threshold distance of each other, and wherein the second arrangement of users comprises the first user and the at least one unauthenticated user;

responsive to the users in the second arrangement of users being within the threshold distance of each other, designating the users in the second arrangement of users as unauthenticated users;

determining aggregate profile data for the users in the second arrangement of users, responsive to the users in the second arrangement of users being designated as unauthenticated users;

determining a third arrangement of users at a third time, wherein the users in the third arrangement of users are more than the threshold distance away from each other;

acquiring, using one or more sensors, one or more images of at least a portion of the third arrangement of users;

determining, using the one or more images, one or more characteristics of the first user;

authenticating, at a fourth time, the first user that was part of the third arrangement of users based on the one or more characteristics of the first user;

updating the aggregate profile data by removing profile data associated with the first user, based on the first user being authenticated at the fourth time;

determining that the first user has interacted with an item at an inventory location; and updating the persistent profile data assigned to the first user to include information associated with the item.

11. The method of claim 10, further comprising:
assigning transient profile data to the at least one unauthenticated user before the first time; and
assigning the aggregate profile data to the users in the second arrangement of users after the second time, responsive to the users in the second arrangement of users being designated as unauthenticated users.

12. The method of claim 10, further comprising:
determining a set of possible user identities associated with the users in the second arrangement of users, responsive to the users in the second arrangement of users being designated as unauthenticated users; and
determining profile data associated with the set of possible user identities;
wherein the aggregate profile data is based at least in part on the profile data associated with the set of possible user identities.

13. The method of claim 10, further comprising:
determining that the first user is within a second threshold distance of a display device at the first time;
presenting a first user interface on the display device based on the persistent profile data associated with the first user before the first time;
determining that the first user is within the second threshold distance of the display device after the second time but before the fourth time;
presenting a second user interface on the display device based on the aggregate profile data;
determining that the first user is within the second threshold distance of the display device after the fourth time; and
presenting a third user interface on the display device based on the persistent profile data that has been updated.

14. The method of claim 10, further comprising:
assigning transient profile data to the at least one unauthenticated user before the first time;
determining that the at least one unauthenticated user and the first user are within a second threshold distance of a display device at the first time;

determining second aggregate profile data based on common settings among the transient profile data and the persistent profile data; and
presenting, at the first time, a user interface on the display device based on the second aggregate profile data.

15. The method of claim 10, further comprising:
determining identification of the first user is unreliable at the second time;
presenting a first user interface based at least in part on the aggregate profile data;
determining a response to the first user interface from the first user;
identifying the first user based at least on the response;
determining the identification of the first user is reliable; and
presenting a second user interface based on the persistent profile data associated with the first user, after the determining the identification of the first user is reliable.

16. A method comprising:
authenticating a first user;
assigning persistent profile data to the first user;
determining, at a first time, that users in a group are within a threshold distance of each other, wherein the users in the group include the first user;
designating all the users in the group as unauthenticated users, responsive to the users in the group being within the threshold distance from each other;
determining aggregate profile data for the users in the group based on all the users in the group being designated as unauthenticated users;
acquiring one or more images using one or more sensors;
determining, using the one or more images, one or more characteristics of the first user;
establishing an identity of the first user in the group at a second time based on the one or more characteristics of the first user;
updating the aggregate profile data by removing profile data associated with the first user, based on the identity of the first user being established at the second time;
determining that the first user has interacted with an item at an inventory location; and
updating the persistent profile data assigned to the first user to include information associated with the item.

17. The method of claim 16, further comprising:
determining a set of possible user identities for the users in the group at the first time, responsive to the users in the group being designated as unauthenticated users; and
determining profile data associated with one or more of the user identities in the set;
wherein the aggregate profile data is determined based at least on the profile data associated with the one or more user identities in the set.

18. The method of claim 16, further comprising:
determining that identification of the users in the group is unreliable;
wherein the designating all the users in the group as unauthenticated users is based on the determining that the identification of the users in the group is unreliable.

19. The method of claim 16, further comprising:
determining profile data associated with the users in the group at the first time; and
determining one or more common values among the profile data for the users in the group at the first time, wherein the aggregate profile data is based on the one or more common values among the profile data for the users in the group at the first time.

20. The method of claim 16, further comprising:
assigning the aggregate profile data to the first user at the first time.

\* \* \* \* \*